US012382350B2

United States Patent
Wang et al.

(10) Patent No.: US 12,382,350 B2
(45) Date of Patent: Aug. 5, 2025

(54) INFORMATION CONFIGURATION METHOD AND APPARATUS, AND COMMUNICATION DEVICE

(71) Applicant: GUANGDONG OPPO MOBILE TELECOMMUNICATIONS CORP., LTD., Dongguan (CN)

(72) Inventors: Shukun Wang, Dongguan (CN); Haitao Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 370 days.

(21) Appl. No.: 17/862,864

(22) Filed: Jul. 12, 2022

(65) Prior Publication Data

US 2022/0353769 A1    Nov. 3, 2022

Related U.S. Application Data

(63) Continuation of application No. PCT/CN2020/072445, filed on Jan. 16, 2020.

(51) Int. Cl.
*H04W 36/00*    (2009.01)

(52) U.S. Cl.
CPC .... *H04W 36/0058* (2018.08); *H04W 36/0069* (2018.08)

(58) Field of Classification Search
CPC ......... H04W 36/0058; H04W 36/0069; H04W 76/34; H04W 76/15; H04W 36/36
(Continued)

(56) References Cited

U.S. PATENT DOCUMENTS

2020/0053815 A1\* 2/2020 Teyeb ............... H04W 76/11
2020/0351971 A1\* 11/2020 Fiorani ............. H04B 17/318
(Continued)

FOREIGN PATENT DOCUMENTS

CN    109548095 A    3/2019
CN    110519777 A    11/2019
(Continued)

OTHER PUBLICATIONS

International Search Report and Written Opinion dated Oct. 20, 2020 in International Application No. PCT/CN2020/072445. English translation attached.
(Continued)

*Primary Examiner* — Kwang B Yao
*Assistant Examiner* — Syed M Bokhari
(74) *Attorney, Agent, or Firm* — Sheppard, Mullin, Richter & Hampton LLP

(57) ABSTRACT

Embodiments of the present disclosure provide an information configuration method and apparatus, and a communication device. The method includes: transmitting, by a Master Node (MN), a first request message to a Secondary Node (SN), wherein the first request message is used to request for configuring a conditional Primary Secondary Cell (PSCell) change; receiving, by the MN, a first response message transmitted by the SN, wherein the first response message is used for indicating that the SN accepts the first request message; and transmitting, by the MN to a terminal device, at least one of a PSCell change condition configuration, a target PSCell configuration, and a radio resource configuration on an MN side.

16 Claims, 11 Drawing Sheets

(58) Field of Classification Search
USPC .......................................................... 370/331
See application file for complete search history.

(56) References Cited

U.S. PATENT DOCUMENTS

| | | | |
|---|---|---|---|
| 2021/0099926 A1* | 4/2021 | Chen ...................... | H04L 5/0098 |
| 2022/0086704 A1* | 3/2022 | Futaki ............... | H04W 36/0027 |

FOREIGN PATENT DOCUMENTS

| | | |
|---|---|---|
| WO | 2019075691 A1 | 4/2019 |
| WO | 2019160281 A1 | 8/2019 |
| WO | 2019214732 A1 | 11/2019 |
| WO | 2019228459 A1 | 12/2019 |

OTHER PUBLICATIONS

NEC. "Applicability of CHO agreements to conditional PSCell change", 3GPP TSG-RAN WG2 #107bis R2-1912983, Oct. 18, 2019(Oct. 18, 2019), section 2.

CATT. "Consideration on MN Initiated Conditional SN Change Procedure", 3GPP TSG-RAN3 Meeting #106 R3-196725, Nov. 22, 2019(Nov. 22, 2019), section 2.

CATT. "Consideration on SN Initiated Conditional SN Change Procedure", 3GPP TSG-RAN3 Meeting #106 R3-196726, Nov. 22, 2019(Nov. 22, 2019), section 2.

Communication pursuant to Article 94(3) EPC for European application 20913812.2 mailed Jul. 5, 2023.

Extended European Search Report dated Nov. 23, 2022 received in European Patent Application No. EP20913812.2.

VIVO:"Remaining issue of conditional PSCell addition and change", 3GPP Draft; R2-1914703,3rd Generation Partnership Project(3GPP), Mobile Competence Centre ;650 ,Route Des Lucioles ; F-06921 Sophia-Atipolis Cedex; France, vol. RAN WG2, No. Reno, USA; Nov. 18, 2019-Nov. 22, 2019,Nov. 8, 2019 (Nov. 8, 2019),XP051816707.

HUAWEI :"Conditional SN Change in MR-DC", 3GPP Draft; R3-195587, 3rd Generation Partnership PROJECT(3GPP) ,Mobile Competence Centre ; 650,Route Des Lucioles ; F-06921 Sophi A-Antipolis Cedex;France,vol. RAN WG3 ,No. Chongqing, China;Oct. 14, 2019-Oct. 18, 2019,Oct. 5, 2019(Oct. 5, 2019) , XP051810393.

CATT :"TP for TS37.340 BLCR Conditional SN Addition&Change Procedure",3GPP Draft;R3-196727, 3rd Generation Partnership Project (3GPP) , Mobile Competence Centre ;650,Route Des Lucioles ; F-06921 Sophia-Antipolis Cedex; France,vol. RAN WG3 ,No. Reno, NV, USA;Nov. 18, 2019-Nov. 22, 2019,Nov. 9, 2019(Nov. 9, 2019) , pp. 1-28,XP051823910.

NEC :"Applicability of CHO agreements toconditional PSCell change", 3GPP Draft; R2-1912983_ COND PSCell CH, 3rd Generation Partnership PROJECT(3GPP) ,Mobile Competence Centre ; 650, Route Desluciole s ; F-06921 Sophia-Antipolis Cedex; France,vol. RAN WG2, No. Chongqing, China;Oct. 14, 2019-Oct. 18, 2019,Oct. 4, 2019(Oct. 4, 2019) , XP051791012.

The First Office Action from corresponding Chinese Application No. 202310242193.0 dated Aug. 28, 2024.

NEC, "Applicability of CHO agreements to conditional PSCell change", 3GPP TSG-RAN WG2 #107bis, , Section 2, Oct. 18, 2019.

CATT, "Consideration on MN Initiated Conditional SN Change Procedure", 3GPP TSG-RAN3 Meeting #106, R3-196725, Section 2, Nov. 22, 2019.

CATT, "Consideration on SN Initiated Conditional SN Change Procedure", 3GPP TSG-RAN3 Meeting #106, R3-196726, Section 2, Nov. 22, 2019.

* cited by examiner

INFORMATION CONFIGURATION METHOD AND APPARATUS, AND COMMUNICATION DEVICE

CROSS-REFERENCE TO RELATED APPLICATIONS

The present application is a continuation of International Application No. PCT/CN2020/072445 filed on Jan. 16, 2020, which is hereby incorporated by reference in its entirety.

TECHNICAL FIELD

Embodiments of the present disclosure relate to the field of mobile communication technologies, and more particularly, to an information configuration method and apparatus, and a communication device.

BACKGROUND

Primary Secondary Cell (PSCell) changes are classified into intra-Secondary Node (intra-SN) PSCell changes and inter-SN PSCell changes. The intra-SN PSCell changes can be further classified into PSCell changes affecting Master Node (MN) and PSCell changes without affecting MN. The inter-SN PSCell changes belong to the PSCell changes affecting MN.

For a PSCell change affecting MN, a New Radio (NR) system does not support a conditional PSCell change affecting MN, resulting in a high PSCell change latency or a risk of a PSCell change failure.

SUMMARY

Embodiments of the present disclosure provide an information configuration method and apparatus, and a communication device.

According to an embodiment of the present disclosure, an information configuration method includes: transmitting, by an MN, a first request message to an SN, wherein the first request message is used to request for configuring a conditional PSCell change; receiving, by the MN, a first response message transmitted by the SN, wherein the first response message is used for indicating that the SN accepts the first request message; and transmitting, by the MN to a terminal device, at least one of a PSCell change condition configuration, a target PSCell configuration, and a radio resource configuration on an MN side.

According to an embodiment of the present disclosure, an information configuration method includes: receiving, by an MN, a first request message transmitted by an SN, wherein the first request message is used to request for configuring a conditional PSCell change; transmitting, by the MN, a first response message to the SN, wherein the first response message is used for indicating that the MN accepts the first request message; and transmitting, by the MN to the terminal device, at least one of a PSCell change condition configuration, a target PSCell configuration, and a radio resource configuration on an MN side.

According to an embodiment of the present disclosure, an information configuration method includes: transmitting, by an MN, a second request message to a target SN, wherein the second request message is used to request for configuring a conditional SN addition; receiving, by the MN, a second response message transmitted by the target SN, wherein the second response message is used for indicating that the target SN accepts the second request message; and transmitting, by the MN to a terminal device, at least one of an SN addition condition configuration, a target SN configuration, a target PSCell configuration, and a radio resource configuration on an MN side.

According to an embodiment of the present disclosure, a communication device includes: a memory having a computer program stored thereon; and a processor configured to invoke and execute the computer program stored in the memory to perform the information configuration method as described above.

BRIEF DESCRIPTION OF DRAWINGS

FIG. 2-1 is a flowchart illustrating an MN-initiated SN modification procedure.

FIG. 2-2 is a flowchart illustrating an SN-initiated SN modification procedure affecting MN.

FIG. 2-3 is a flowchart illustrating an SN-initiated SN modification procedure without affecting MN.

FIG. 3-1 is a flowchart illustrating an MN-initiated SN change procedure.

FIG. 3-2 is a flowchart illustrating an SN-initiated SN change procedure.

DESCRIPTION OF EMBODIMENTS

Technical solutions according to embodiments of the present disclosure will be described below in combination with accompanying drawings of the embodiments of the present disclosure. Obviously, the embodiments described below are only a part of the embodiments of the present disclosure, rather than all of the embodiments. On a basis of the embodiments in the present disclosure, all other embodiments obtained by a person skilled in the art without creative labor shall fall within the protection scope of the present disclosure.

The technical solutions according to the embodiments of the present disclosure can be applied to various communication systems, such as a Long Term Evolution (LTE) system, an LTE Frequency Division Duplex (FDD) system, an LTE Time Division Duplex (TDD) system, a 5th-Generation (5G) communication system, or a future communication system, etc.

Figure 1:
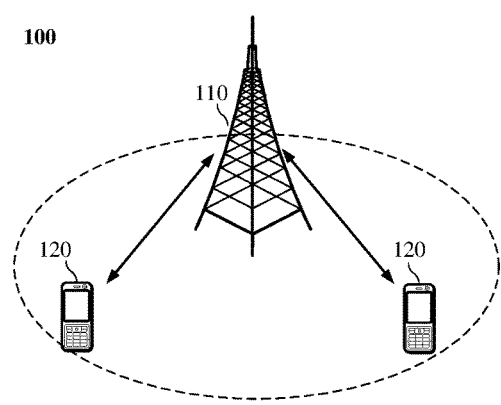
FIG. 1 is a schematic diagram showing a communication system architecture according to an embodiment of the present disclosure.

Exemplarily, a communication system 100 in which an embodiment of the present disclosure is applied is as illustrated in FIG. 1. The communication system 100 may include a network device 110. The network device 110 may be a device that communicates with a terminal 120 (or called a communication terminal or a terminal). The network device 110 may provide communication coverage for a specific geographic region, and may communicate with a terminal located in the coverage region. Optionally, the network device 110 may be an Evolutional Node B (eNB or eNodeB) in an LTE system, or a wireless controller in a Cloud Radio Access Network (CRAN). Alternatively, the network device can be a mobile switching center, a relay station, an access point, a vehicle-mounted device, a wearable device, a hub, a switch, a bridge, a router, a network side device in a 5G network, or a network device in a future communication system, etc.

The communication system 100 further includes at least one terminal 120 located within the coverage region of the network device 110. The "terminal" used herein includes, but is not limited to, a device configured to receive/transmit a communication signal via a wired line connection, such as a Public Switched Telephone Network (PSTN), a Digital Subscriber Line (DSL), a digital cable, a direct cable connection, and/or via another data connection/network, and/or via a wireless interface, for example, for a cellular network, a Wireless Local Area Network (WLAN), a digital television network such as a Digital Video Broadcasting Handheld (DVB-H) network, a satellite network, and an Amplitude Modulation-Frequency Modulation (AM-FM) broadcast transmitter, and/or via another terminal; and/or an Internet of Things (IoT) device. A terminal configured to communicate through the wireless interface may be referred to as a "wireless communication terminal", a "wireless terminal", or a "mobile terminal". Examples of the mobile terminal include but are not limited to, a satellite or cellular phone, a Personal Communication System (PCS) terminal that may combine a cellular radiotelephone with capabilities such as data processing, facsimile and data communication, a Personal Digital Assistant (PDA) that may include a radiotelephone, a pager, an Internet/intranet access, a Web browser, a notepad, a calendar, and/or a Global Positioning System (GPS) receiver, and a conventional laptop and/or palmtop receiver, or other electronic devices including a radiotelephone transceiver. The terminal can refer to an access terminal, a User Equipment (UE), a user unit, a user station, a mobile station, a mobile platform, a remote station, a remote terminal, a mobile device, a user terminal, a terminal device, a wireless communication device, a user agent, or a user device. The access terminal can be a cellular phone, a cordless phone, a Session Initiation Protocol (SIP) phone, a Wireless Local Loop (WLL) station, a Personal Digital Assistant (PDA), a handheld device having a wireless communication function, a computing device or another processing device connected to a wireless modem, a vehicle-mounted device, a wearable device, a terminal in a 5G network, or a terminal in the future evolved Public Land Mobile Network (PLMN), etc.

Optionally, direct communication, such as Device to Device (D2D) communication, may be performed between the terminals 120.

Optionally, the 5G communication system or the 5G network may also be referred to as an NR system or an NR network.

FIG. 1 exemplarily illustrates one network device and two terminals. Optionally, the communication system 100 may include a plurality of network devices, and within the coverage of each network device there may be a different number of terminals. The embodiments of the present disclosure are not limited to any of these examples.

Optionally, the communication system 100 may also include other network entities such as a network controller and a mobility management entity, and the embodiment of the present disclosure is not limited to any of these examples.

It should be understood that, in the embodiment of the present disclosure, a device having a communication function in a network/system may be referred to as a communication device. Taking the communication system 100 illustrated in FIG. 1 as an example, communication devices may include the network device 110 and the terminals 120, each having a communication function. The network device 110 and the terminal 120 may be any of specific devices described above, and details thereof will be omitted here. The communication device may also include another device in the communication system 100, for example other network entities such as a network controller, a mobility management entity, etc., and embodiments of the present disclosure are not limited to any of these examples.

It should be understood that terms "system" and "network" in the present disclosure are often used interchangeably herein. The term "and/or" in the present disclosure only represents a relationship between correlated objects, including three relationships. For example, "A and/or B" may mean three situations: A only, B only, or both A and B. In addition, the character "/" in the present disclosure generally represents an "or" relationship between the correlated objects preceding and succeeding the symbol.

To facilitate understanding of the technical solutions of the embodiments of the present disclosure, the technical solutions related to the embodiments of the present disclosure will be described below.

With the pursuit of fast speed, low latency, high-speed mobility and high energy efficiency, and given the diversity and complexity of services in future life, the 3rd Generation Partnership Project (3GPP), a global standardization organization, has begun to develop 5G. Main application scenarios of 5G are enhanced Mobile Broadband (eMBB), Ultra-Reliable Low-Latency Communications (URLLC), and massive Machine-Type Communications (mMTC).

For eMBB, on the one hand, it is still targeted at users' access to multimedia content, services, and data, and its demand is growing rapidly. On the other hand, since eMBB may be deployed in different scenarios, such as indoor spaces, urban areas, rural areas, etc., its capabilities and needs vary greatly; hence its capabilities and needs cannot be treated as the same and should be analyzed in detail with specific deployment scenarios. Typical applications of URLLC include industrial automation, power automation, telemedicine operation (surgery), traffic safety guarantee, etc. Typical characteristics of mMTC include a high connection density, a small data volume, latency insensitive services, low costs and a long service life of modules, etc.

In the early deployment of the NR, it was difficult to achieve complete NR coverage, and thus typical network coverage was in a mode of wide LTE coverage plus island NR coverage. Also, a large number of LTE deployments are below 6 GHz, but there is very few sub-6 GHz spectra available for 5G. Therefore, it is necessary to study applications of the NR to spectra above 6 GHz. However, a high-frequency band has limited coverage and fast signal fading. Besides, in order to preserve mobile operators' previous investment in LTE, a tight interworking operation mode between the LTE and the NR is proposed.

In order to realize 5G network deployment and commercial applications as soon as possible, 3GPP first completed the 1-st version of 5G, i.e., Evolved-Universal Terrestrial Radio Access-NR Dual Connectivity (EN-DC, also known as LTE-NR Dual Connectivity). Later in Release-15 (R-15), other DC modes will be supported, namely NR-E-UTRA Dual Connectivity (NE-DC), 5G Core-EN-DC (5GC-EN-DC), and NR DC. In EN-DC, an LTE base station serves as an MN and an NR base station serves as an SN. The LTE base station and the NR base station are connected to an Evolved Packet Core (EPC) core network. In NE-DC, an NR base station serves as an MN and an LTE base station serves as an SN. The NR base station and the LTE base station are connected to a 5GC core network. In 5GC-EN-DC, an LTE base station serves as an MN and an NR base station serves as an SN. The LTE base station and the NR base station are connected to a 5GC core network. In NR DC, an NR base station serves as an MN and another NR base station serves as an SN. The two NR base stations are connected to a 5GC core network.

In R16, it is introduced that a network side configures, based on a measurement result reported by a terminal device, a handover condition and a target cell for handover, such that the terminal device may determine, based on its own measurement result, by itself whether the handover condition configured by the network side is satisfied. When the handover condition is satisfied, a handover to a pre-configured target cell may be performed by the terminal device autonomously, thereby avoiding a handover failure of the terminal device due to a failure to issue a handover instruction or a failure to report a measurement report.

In addition, R16 also supports a condition configuration and a target PSCell configuration that are based on the network side configuration, to implement a conditional PSCell change. In this case, however, the PSCell change does not affect an MN. Here, the condition configuration and the target PSCell configuration are generated by an SN and configured for the terminal device.

Figures 1, 2:
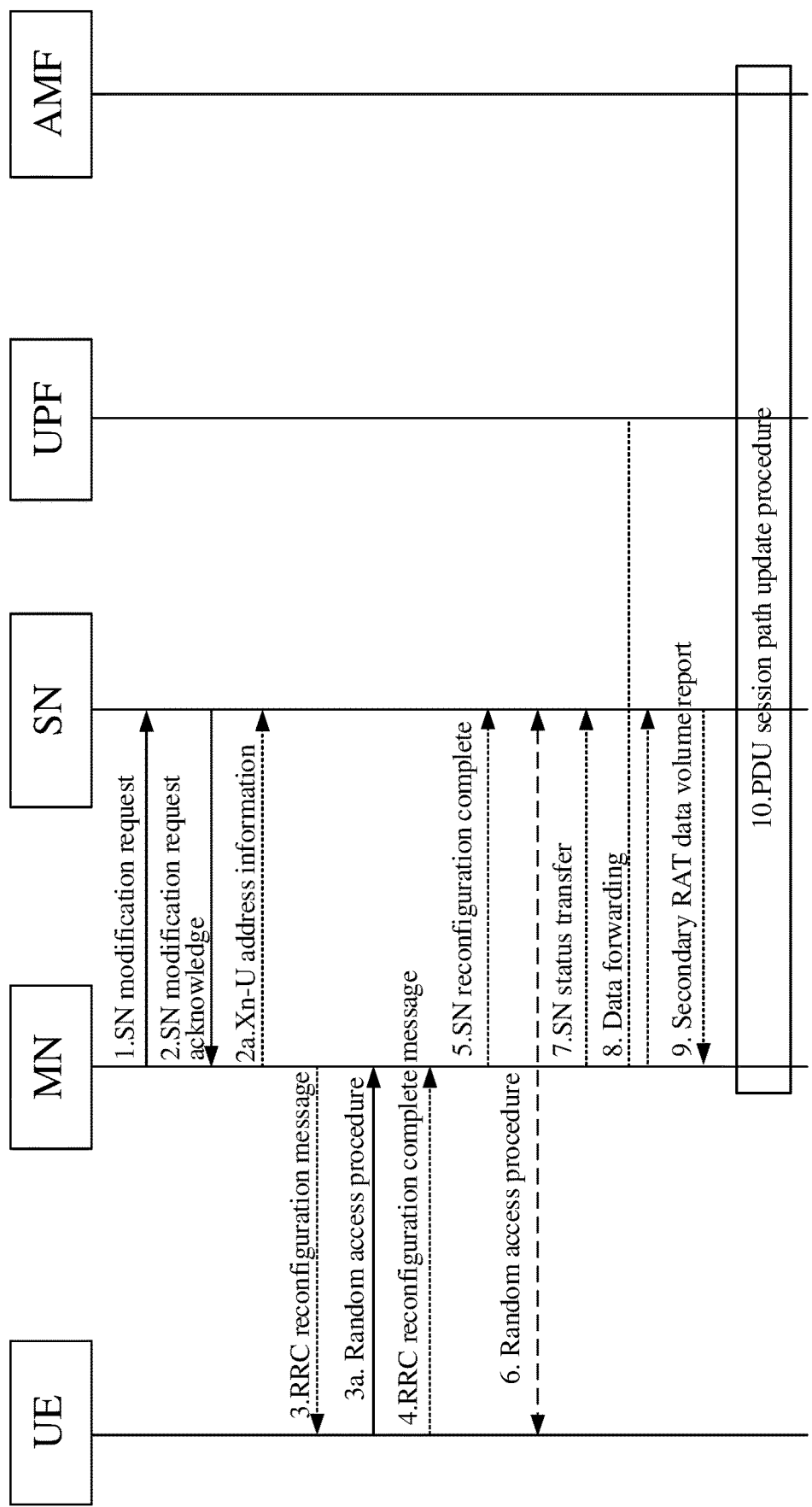
Figure 2:
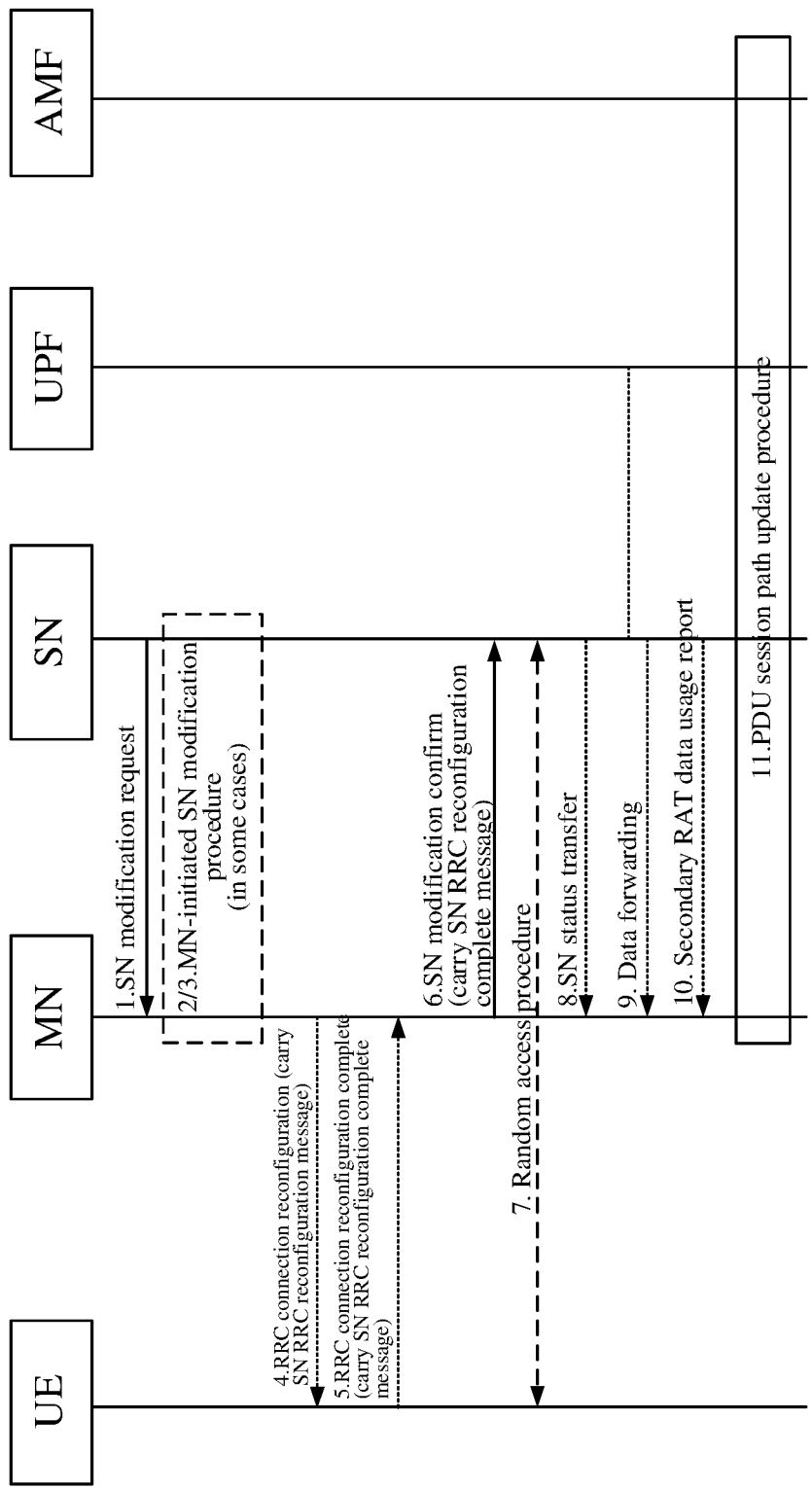
Figures 2, 3:
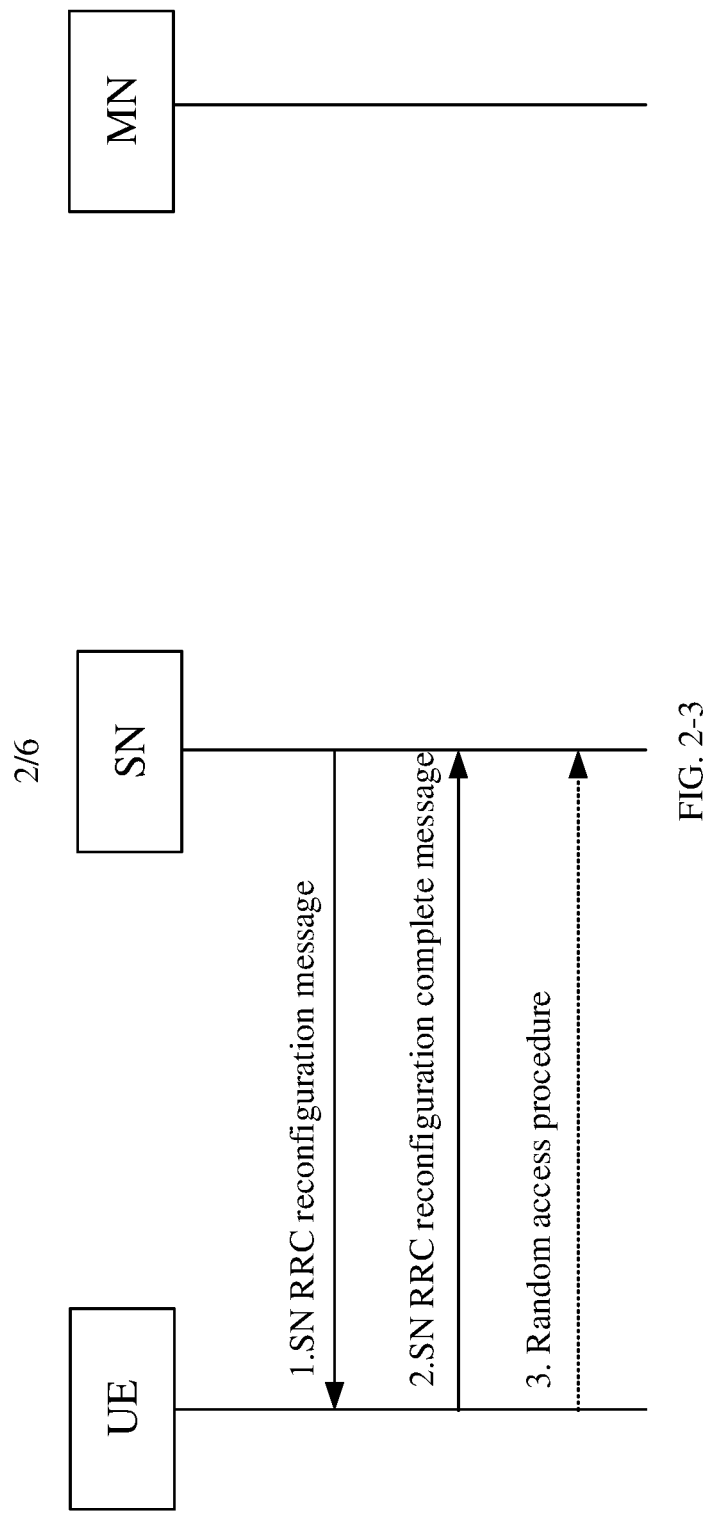
Figures 1, 3:
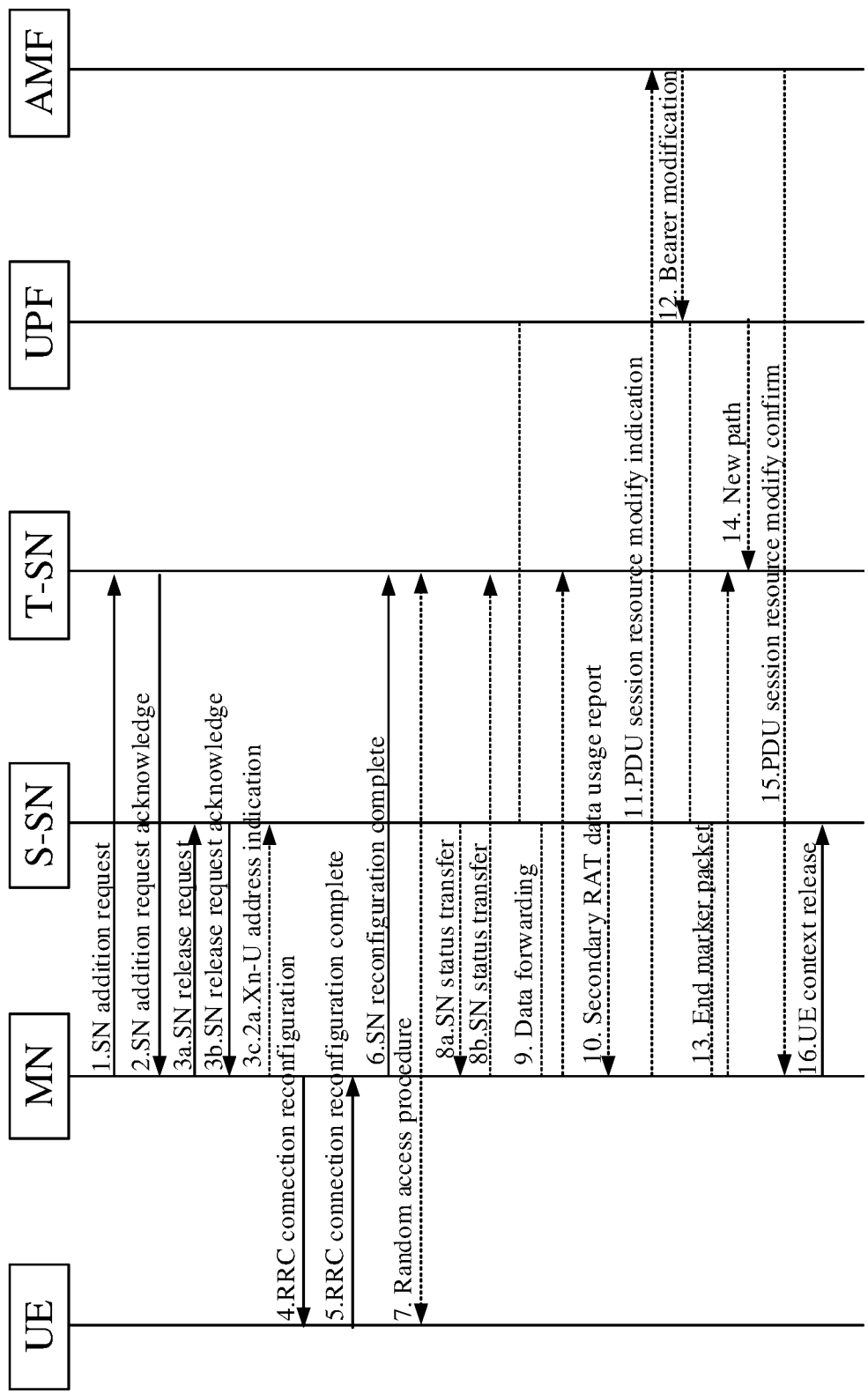
Figures 2, 3:
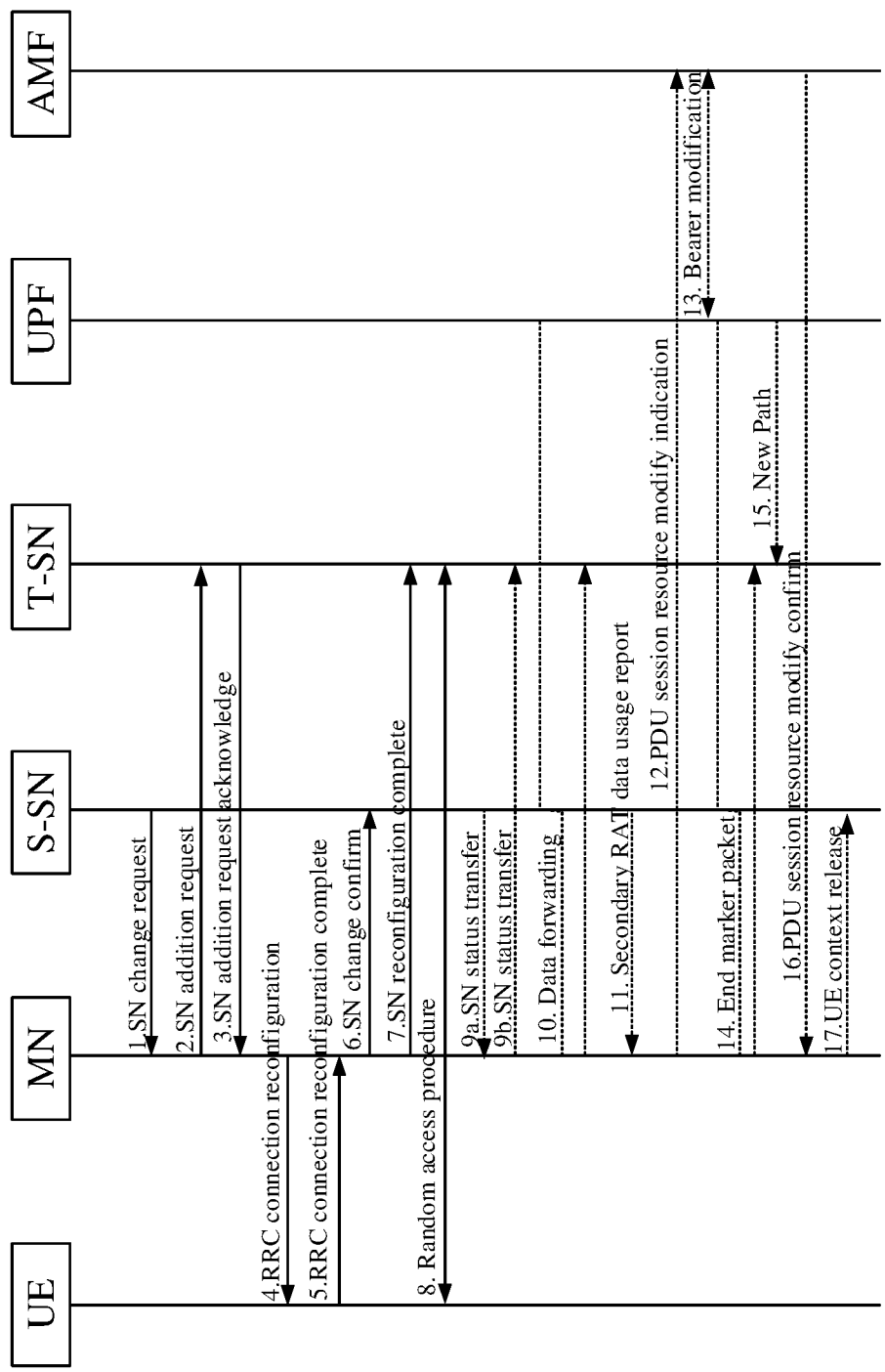

The intra-SN PSCell changes include a scenario without affecting MN and a scenario affecting MN, and in another aspect include an MN-initiated scenario and an SN initiated scenario. FIG. 2-1 shows an MN-initiated SN modification procedure. FIG. 2-2 shows an SN-initiated SN modification procedure affecting MN. FIG. 2-3 shows an SN-initiated SN modification procedure without affecting MN. It should be noted that the SN modification procedure specifically refers to an intra-SN PSCell change procedure.

The inter-SN PSCell changes include an MN-initiated scenario and an SN-initiated scenario. FIG. 3-1 shows an MN-initiated SN change procedure. FIG. 3-2 shows an SN-initiated SN change procedure. It should be noted that the SN change procedure specifically refers to an inter-SN PSCell change procedure.

Currently, the NR supports none of a conditional intra-SN PSCell change affecting MN, a conditional inter-SN PSCell change (which may also be referred to as a conditional inter-SN SN change), and a conditional SN addition. Therefore, the following technical solutions according to the embodiments of the present disclosure are proposed. With the technical solutions according to the embodiments of the present disclosure, the above scenarios can be supported in the standard through negotiation between an MN and an SN.

Figure 4:
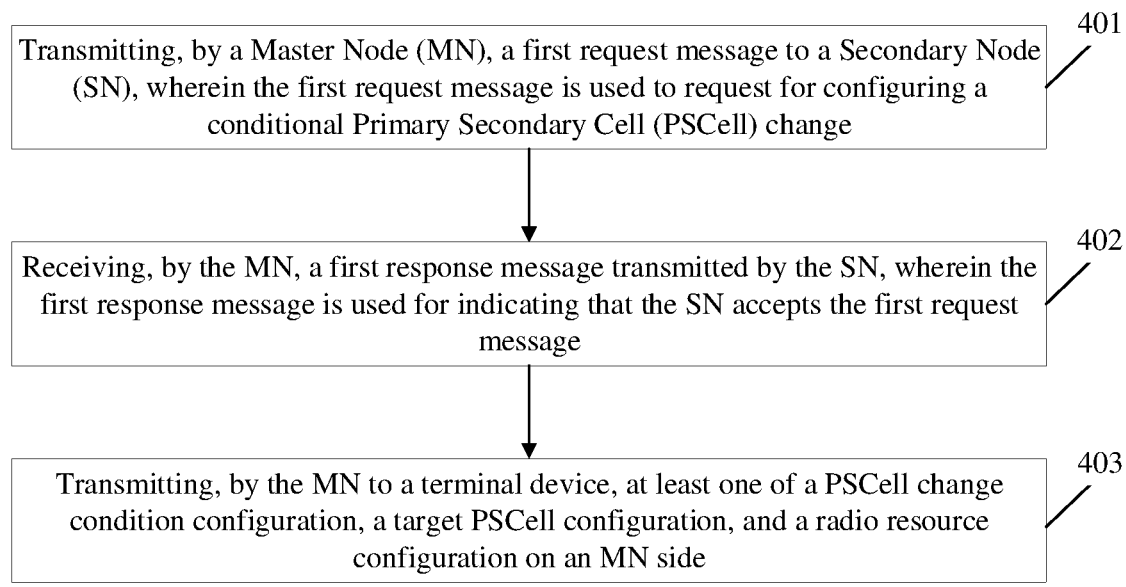
FIG. 4 is a first flowchart illustrating an information configuration method according to an embodiment of the present disclosure.

FIG. 4 is a first flowchart illustrating an information configuration method according to an embodiment of the present disclosure. As illustrated in FIG. 4, the information configuration method includes the following actions.

At block 401, an MN transmits a first request message to an SN. The first request message is used to request for configuring a conditional PSCell change.

At block 402, the MN receives a first response message transmitted by the SN. The first response message is used for indicating that the SN accepts the first request message.

At block 403, the MN transmits to, a terminal device, at least one of a PSCell change condition configuration, a target PSCell configuration, and a radio resource configuration on an MN side.

This embodiment of the present disclosure is applied to a conditional intra-SN PSCell change. Here, the intra-SN PSCell change means that a PSCell change is performed within the SN. For example, an SN covers cell 1, cell 2, and cell 3. Cell 1 is a PSCell and cell 2 and cell 3 are SCells. After the intra-SN PSCell change, cell 2 is a PSCell and cell 1 and cell 3 are SCells.

In embodiments of the present disclosure, when transmitting the first request message to the SN, optionally, the MN may further transmit at least one type of the following information. The following information may be carried in the first request message for transmission, or may be transmitted alone. The following description is made by taking the following information being carried in the first request message for transmission as an example.

In an optional implementation, the first request message carries a first PSCell change condition configuration. The first PSCell change condition configuration is a PSCell change condition configuration proposed by the MN.

Further, optionally, 1) when the SN accepts the first PSCell change condition configuration, the PSCell change condition configuration transmitted by the MN to the terminal device is the first PSCell change condition configuration.

Further, optionally, 2) when the SN does not accept the first PSCell change condition configuration, the first response message carries a second PSCell change condition configuration. The second PSCell change condition configuration is a PSCell change condition configuration revised by the SN. The PSCell change condition configuration transmitted by the MN to the terminal device is the second PSCell change condition configuration.

In an optional implementation, the first request message carries first indication information that indicates a PSCell change type.

Here, the PSCell change type is an intra-SN PSCell change, or an inter-SN PSCell change, or an intra-SN PSCell change without affecting MN, or an intra-SN PSCell change affecting MN.

In an optional implementation, when the PSCell change type indicated by the first indication information is the inter-SN PSCell change or the intra-SN PSCell change affecting MN, the first request message further carries first restriction constraint information. The first restriction constraint information is used for restricting configuration, by the SN for the terminal device, of a radio resource configuration on an SN side.

Further, optionally, when the SN does not accept the first restriction constraint information, the first response message carries second restriction constraint information. The second restriction constraint information is restriction constraint information revised by the SN.

In an optional implementation, the first request message carries a measurement result of the terminal device. The measurement result is used by the SN for configuring the target PSCell configuration.

In an optional implementation of the present disclosure, the intra-SN PSCell change belongs to an MN-initiated PSCell change affecting MN. The entire content of a PSCell change configuration is transmitted on the MN side to the terminal device (reference may be made to Example 1 below).

For this scenario, the first response message carries the target PSCell configuration configured by the SN. The MN transmits, to the terminal device, the PSCell change condition configuration and the target PSCell configuration; or the MN transmits, to the terminal device, the PSCell change condition configuration, the target PSCell configuration, and the radio resource configuration on the MN side.

In an optional implementation of the present disclosure, the intra-SN PSCell change belongs to an MN-initiated PSCell change affecting MN. Some of the content of the PSCell change configuration is transmitted to the terminal device on the MN side, and some is transmitted to the terminal device on the SN side (reference may be made to Example 2 below).

For this scenario, the MN transmits, to the terminal device, the PSCell change condition configuration, with the target PSCell configuration transmitted by the SN to the terminal device; or the MN transmits, to the terminal device, the PSCell change condition configuration and the radio resource configuration on the MN side, with the target PSCell configuration transmitted by the SN to the terminal device.

It should be noted that configurations delivered by each of the MN and the SN to the terminal device may be a configuration list. Configurations on the MN side may correspond to configurations on the SN side in a one-to-one correspondence according to orders in which they are listed in the configuration lists. Specifically, the configurations on the MN side and the configurations on the SN side are associated with each other based on configuration indices. A plurality of associated configurations form one PSCell change configuration.

Figure 5:
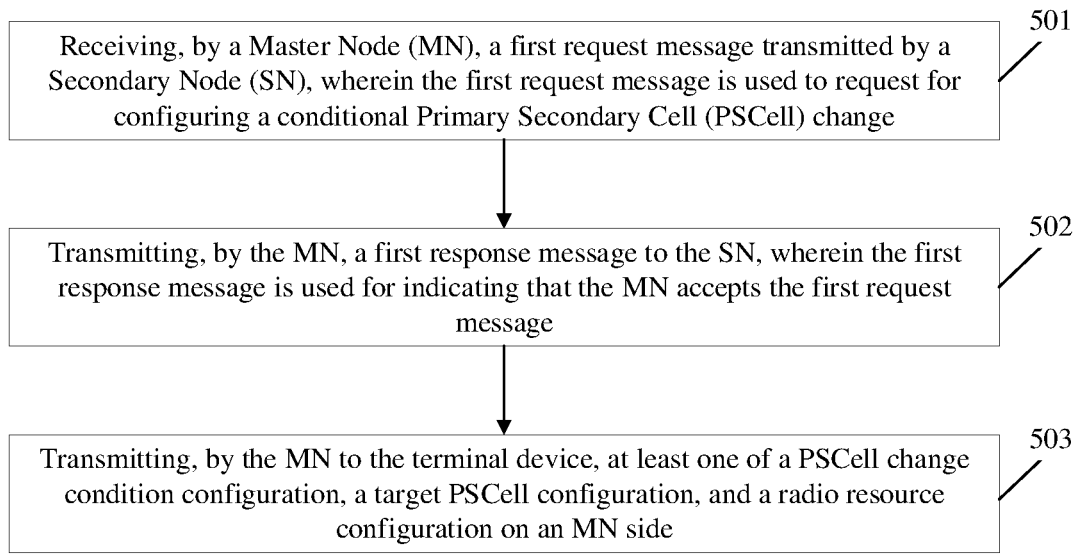
FIG. 5 is a second flowchart illustrating an information configuration method according to an embodiment of the present disclosure.

FIG. 5 is a second flowchart illustrating an information configuration method according to an embodiment of the present disclosure. As illustrated in FIG. 5, the information configuration method includes the following actions.

At block 501, an MN receives a first request message transmitted by an SN. The first request message is used to request for configuring a conditional PSCell change.

At block 502, the MN transmits a first response message to the SN. The first response message is used for indicating that the MN accepts the first request message.

At block 503, the MN transmits, to the terminal device, at least one of a PSCell change condition configuration, a target PSCell configuration, and a radio resource configuration on an MN side.

This embodiment of the present disclosure is applied to a conditional intra-SN PSCell change. Here, the intra-SN PSCell change means that a PSCell change is performed within the SN.

In embodiments of the present disclosure, when transmitting the first request message to the MN, optionally, the SN may further transmit at least one type of the following information. The following information may be carried in the first request message for transmission, or may be transmitted alone. The following description is made by taking the following information being carried in the first request message for transmission as an example.

In an optional implementation, the first request message carries a first PSCell change condition configuration. The first PSCell change condition configuration is a PSCell change condition configuration proposed by the SN.

Further, optionally, 1) when the MN accepts the first PSCell change condition configuration, the PSCell change condition configuration transmitted by the MN to the terminal device is the first PSCell change condition configuration.

Further, optionally, 2) when the MN does not accept the first PSCell change condition configuration, the first response message carries a second PSCell change condition configuration. The second PSCell change condition configuration is a PSCell change condition configuration revised by the MN. The PSCell change condition configuration transmitted by the MN to the terminal device is the second PSCell change condition configuration.

In an optional implementation, the first request message carries first indication information that indicates a PSCell change type.

Here, the PSCell change type is an intra-SN PSCell change, or an inter-SN PSCell change, or an intra-SN PSCell change without affecting MN, or an intra-SN PSCell change affecting MN.

In an optional implementation, when the PSCell change type indicated by the first indication information is the inter-SN PSCell change or the intra-SN PSCell change affecting MN, the first request message further carries first restriction constraint information. The first restriction constraint information is used for restricting configuration, by the SN for the terminal device, of a radio resource configuration on an SN side.

Further, optionally, when the MN does not accept the first restriction constraint information, the first response message carries second restriction constraint information. The second restriction constraint information is restriction constraint information revised by the MN.

In an optional implementation of the present disclosure, the intra-SN PSCell change belongs to an SN-initiated PSCell change affecting MN. The entire content of a PSCell change configuration is transmitted on the MN side to the terminal device (reference may be made to Example 3 below).

For this scenario, the first request message carries the target PSCell configuration configured by the SN. The MN transmits, to the terminal device, the PSCell change condition configuration and the target PSCell configuration; or the MN transmits, to the terminal device, the PSCell change condition configuration, the target PSCell configuration, and the radio resource configuration on the MN side.

In an optional implementation of the present disclosure, the intra-SN PSCell change belongs to an SN-initiated PSCell change affecting MN. Some of the content of the PSCell change configuration is transmitted to the terminal device on the MN side, and some is transmitted to the terminal device on the SN side (reference may be made to Example 4 below).

For this scenario, the MN transmits, to the terminal device, the PSCell change condition configuration, with the target PSCell configuration transmitted by the SN to the terminal device; or the MN transmits, to the terminal device, the PSCell change condition configuration and the radio resource configuration on the MN side, with the target PSCell configuration transmitted by the SN to the terminal device; or the MN transmits, to the terminal device, the radio resource configuration on the MN side, with the PSCell change condition configuration and the target PSCell configuration transmitted to the terminal device by the SN.

It should be noted that configurations delivered by each of the MN and the SN to the terminal device may be a configuration list. Configurations on the MN side may correspond to configurations on the SN side in a one-to-one correspondence according to orders in which they are listed in the configuration lists. Specifically, the configurations on the MN side and the configurations on the SN side are associated with each other based on configuration indices. A plurality of associated configurations form one PSCell change configuration.

Figure 6:
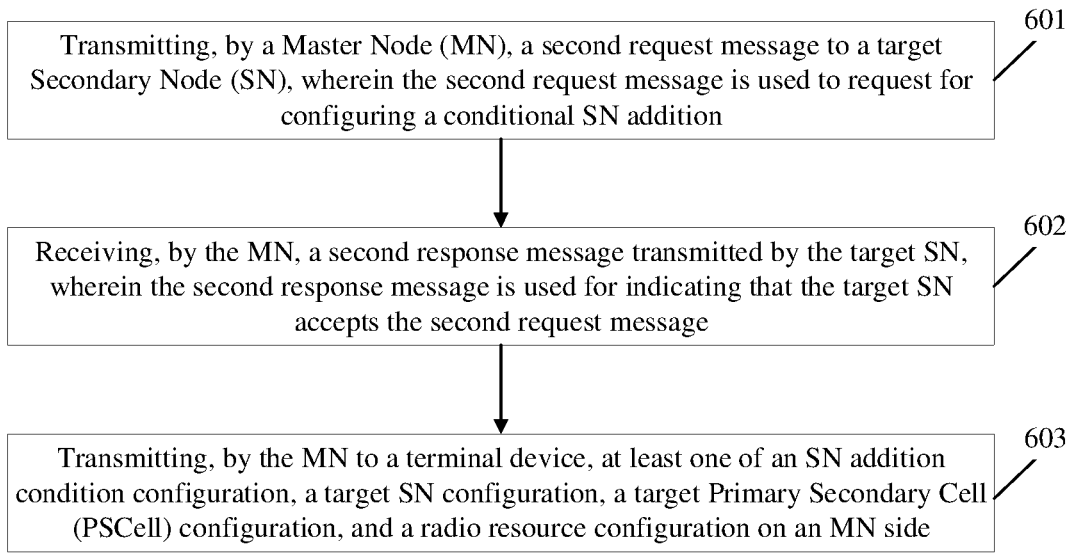
FIG. 6 is a third flowchart illustrating an information configuration method according to an embodiment of the present disclosure.

FIG. 6 is a third flowchart illustrating an information configuration method according to an embodiment of the present disclosure. As illustrated in FIG. 6, the information configuration method includes the following actions.

At block 601, an MN transmits a second request message to a target SN. The second request message is used to request for configuring a conditional SN addition.

At block 602, the MN receives a second response message transmitted by the target SN. The second response message is used for indicating that the target SN accepts the second request message.

At block 603, the MN transmits, to a terminal device, at least one of an SN addition condition configuration, a target SN configuration, a target PSCell configuration, and a radio resource configuration on an MN side.

This embodiment of the present disclosure is applied to a conditional inter-SN PSCell change, which may also be referred to as a conditional SN change. Here, the inter-SN PSCell change means that a PSCell change is performed among SNs. For example, SN1 covers cell 1 and cell 2, and SN2 covers cell 3 and cell 4. The PSCell may be changed from cell 1 to cell 3.

In embodiments of the present disclosure, when transmitting the second request message to the SN, optionally, the MN may further transmit at least one type of the following information. The following information may be carried in the second request message for transmission, or may be transmitted alone. The following description is made by taking the following information being carried in the second request message for transmission as an example.

In an optional implementation, the second request message carries a first SN addition condition configuration. The first SN addition condition configuration is an SN addition condition configuration proposed by the MN.

Further, optionally, 1) when the target SN accepts the first SN addition condition configuration, a target SN addition condition configuration transmitted by the MN to the terminal device is the first SN addition condition configuration.

Further, optionally, 2) when the target SN does not accept the first SN addition condition configuration, the second response message carries a second SN addition condition configuration. The second SN addition condition configuration is an SN addition condition configuration revised by the target SN. The SN addition condition configuration transmitted by the MN to the terminal device is the second SN addition condition configuration.

In an optional implementation, the second request message carries first restriction constraint information. The first restriction constraint information is used for restricting configuration, by the target SN for the terminal device, of a radio resource configuration on a target SN side.

Further, optionally, when the target SN does not accept the first restriction constraint information, the second response message carries second restriction constraint information. The second restriction constraint information is restriction constraint information revised by the target SN.

In an optional implementation, the second request message carries a measurement result of the terminal device, and the measurement result is used by the target SN for configuring at least one of the target SN configuration and the target PSCell configuration.

In an optional implementation of the present disclosure, the inter-SN PSCell change belongs to an MN-initiated PSCell change. The entire content of a PSCell change configuration is transmitted on the MN side to the terminal device (reference may be made to Example 5 below).

For this scenario, the second response message carries at least one of the target SN configuration configured by the target SN and the target PSCell configuration configured by the target SN. The MN transmits, to the terminal device, the SN addition condition configuration and at least one of the target SN configuration and the target PSCell configuration; or the MN transmits, to the terminal device, the SN addition condition configuration, the radio resource configuration on the MN side, and at least one of the target SN configuration and the target PSCell configuration.

In addition, the above technical solutions may also be applied to the conditional SN addition. Here, the SN addition belongs to an MN-initiated SN addition. The entire content of an SN addition configuration is transmitted to the terminal device on the MN side (reference may be made to Example 8 below).

In an optional implementation of the present disclosure, the inter-SN PSCell change belongs to an SN-initiated PSCell change. The entire content of a PSCell change configuration is transmitted on the MN side to the terminal device (reference may be made to Example 6 below).

For this scenario, the method further includes, prior to transmitting, by the MN, the second request message to the target SN: receiving, by the MN, a third request message transmitted by an original SN, the third request message being used to request for configuring a conditional PSCell change; and transmitting, by the MN, a third response message to the original SN, the third response message being used for indicating that the MN accepts the third request message.

In an optional implementation, the third request message carries a first PSCell change condition configuration. The first PSCell change condition configuration is a PSCell change condition configuration proposed by the original SN.

Further, optionally, when the MN does not accept the first PSCell change condition configuration, the MN revises the first PSCell change condition configuration to a second PSCell change condition configuration.

In an optional implementation, the third request message further carries identification information of a target PSCell corresponding to the first PSCell change condition configuration. The target PSCell is one of cells of the target SN.

Further, optionally, the identification information of the target PSCell includes at least one of a Physical Cell Identity (PCI), a frequency point, a New Radio-Cell Global Identity (N-CGI), and a base station identifier.

In an optional implementation, the third request message carries first indication information that indicates a PSCell change type.

Here, the PSCell change type is an intra-SN PSCell change, or an inter-SN PSCell change, or an intra-SN PSCell change without affecting MN, or an intra-SN PSCell change affecting MN.

Based on the conditional PSCell change configuration or the conditional SN change configuration, the terminal device triggers, based on the SN addition condition configuration, initiation of a random access procedure to the target SN, and induces a release on an original SN in any one of the following ways.

Way 1: the target SN transmits an original SN release request message to the MN, to trigger the MN to request the original SN to release a resource.

Way 2: the target SN transmits the original SN release request message to the original SN, to trigger the original SN to release a resource.

Figure 7:
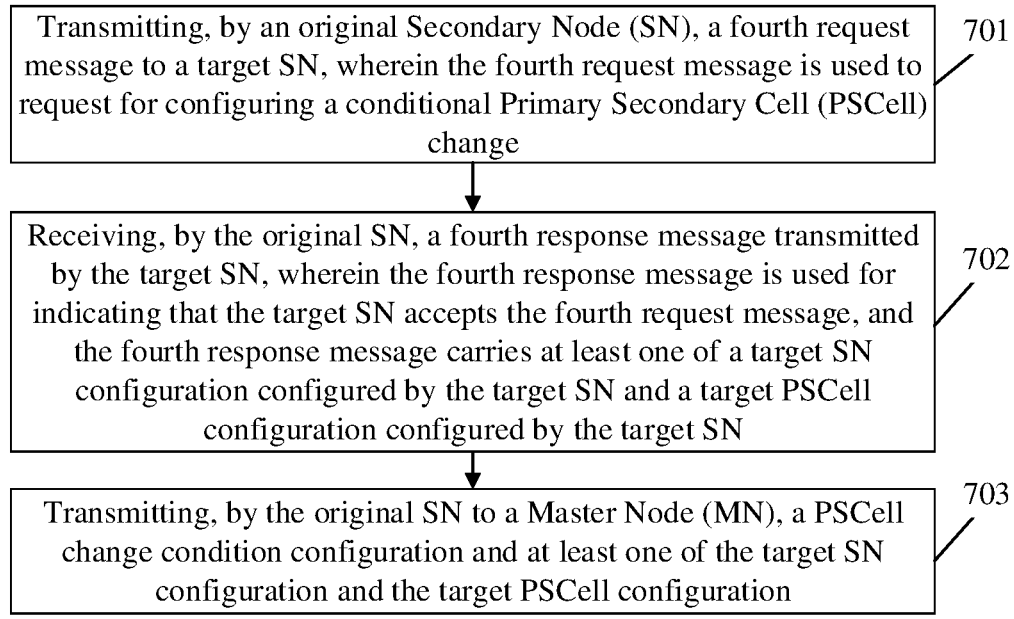
FIG. 7 is a fourth flowchart illustrating an information configuration method according to an embodiment of the present disclosure.

FIG. 7 is a fourth flowchart illustrating an information configuration method according to an embodiment of the present disclosure. As illustrated in FIG. 7, the information configuration method includes the following actions.

At block 701, an original SN transmits a fourth request message to a target SN. The fourth request message is used to request for configuring a conditional PSCell change.

At block 702, the original SN receives a fourth response message transmitted by the target SN. The fourth response message indicates that the target SN accepts the fourth request message, and the fourth response message carries at least one of a target SN configuration configured by the target SN and a target PSCell configuration configured by the target SN.

At block 703, the original SN transmits, to an MN, a PSCell change condition configuration and at least one of the target SN configuration and the target PSCell configuration.

This embodiment of the present disclosure is applied to a conditional inter-SN PSCell change. Here, the inter-SN PSCell change belongs to an SN-initiated PSCell change. Some of the content of a PSCell change configuration is transmitted to the terminal device on the MN side, and some is transmitted to the terminal device on an original SN side (reference may be made to Example 7 below). It should be noted that the conditional inter-SN PSCell change may also be referred to as the conditional SN change.

In embodiments of the present disclosure, relevant configurations performed on the MN side and the original SN side may be implemented through any of the following ways.

Way 1: the PSCell change condition configuration and at least one of the target SN configuration and the target PSCell configuration are transmitted by the MN to a terminal device.

Way 2: the PSCell change condition configuration and at least one of the target SN configuration and the target PSCell configuration are transmitted by the original SN to a terminal device.

Way 3: the PSCell change condition configuration is transmitted by the MN to a terminal device, and the target SN configuration and/or the target PSCell configuration is transmitted by the original SN to the terminal device.

Way 4: the PSCell change condition configuration is transmitted by the original SN to a terminal device, and the target SN configuration and/or the target PSCell configuration is transmitted by the MN to the terminal device.

Further, optionally, a radio resource configuration on an MN side is transmitted by the MN to the terminal device.

It should be noted that configurations delivered by each of the MN and the original SN to the terminal device may be a configuration list. Configurations on the MN side may correspond to configurations on the original SN side in a one-to-one correspondence according to orders in which they are listed in the configuration lists. Specifically, the configurations on the MN side and the configurations on the original SN side are associated with each other based on configuration indices. A plurality of associated configurations form one PSCell change configuration.

In an optional implementation, the fourth request message carries a first PSCell change condition configuration and/or first restriction constraint information. The first PSCell change condition configuration is a PSCell change condition configuration proposed by the original SN. The first restriction constraint information is used for restricting configuration, by the SN for the terminal device, of a radio resource configuration on an SN side.

Further, optionally, when the target SN does not accept the first PSCell change condition configuration and/or first restriction constraint information, the fourth response message further carries a second PSCell change condition configuration and/or second restriction constraint information. The second PSCell change condition configuration is a PSCell change condition configuration revised by the target SN. The second restriction constraint information is restriction constraint information revised by the target SN.

Based on the conditional PSCell change configuration or the conditional SN change configuration, the terminal device triggers, based on the PSCell change condition configuration, initiation of a random access procedure to the target SN, and induces a release on an original SN in any one of the following ways.

Way 1: the target SN transmits an original SN release request message to the MN, to trigger the MN to request the original SN to release a resource.

Way 2: the target SN transmits the original SN release request message to the original SN, to trigger the original SN to release a resource.

The technical solutions according to the embodiments of the present disclosure will be exemplified below with specific application examples.

Example 1

This example is about the conditional intra-SN PSCell change. Here, the intra-SN PSCell change belongs to an MN-initiated PSCell change affecting MN. The entire content of the PSCell change configuration is transmitted to the terminal device on the MN side. A PSCell change procedure of this example includes the following steps.

1. The MN transmits a configuration request to the SN. The configuration request is used to indicate configuring a conditional PSCell change.

Here, optionally, the MN may trigger the PSCell change procedure based on a measurement report reported by the terminal device.

Further, optionally, the MN also transmits, to the SN, a measurement result of the terminal device for the SN to determine a target PSCell.

Further, optionally, the MN also transmits, to the SN, a condition configuration of the PSCell change proposed by the MN (referred to as the PSCell change condition configuration for short).

Further, optionally, indication information is carried in the configuration request transmitted by the MN to the SN. The indication information is used to indicate a PSCell change type. Here, the PSCell change type may be an intra-SN PSCell change, or an inter-SN PSCell change, or an intra-SN PSCell change without affecting MN, or an intra-SN PSCell change affecting MN, etc.

Further, optionally, when the PSCell change type is the inter-SN PSCell change or the intra-SN PSCell change affecting MN, the MN also transmits restriction constraint information (restriction constraint information on the SN side) to the SN. The restriction constraint information is used to determine a restriction constraint condition for the SN to configure radio resources for the terminal device.

2.1. When the SN accepts the configuration request from the MN, the SN generates configuration information of the target PSCell (referred to as a target PSCell configuration for short) or configuration information of the SN (referred to as an SN configuration for short) and transmits, to the MN, the configuration information of the target PSCell or the configuration information of the SN.

Here, accepting, by the SN, the configuration request from the MN may include the following two cases.

Case I): the SN accepts the condition configuration and/or the restriction constraint information. Further, the SN accepts the configuration request from the MN.

Case II): the SN does not accept the condition configuration and/or restriction constraint information. Further, the SN accepts the configuration request from the MN after modifying the condition configuration and/or the restriction constraint information, and transmits, to the MN, the revised condition configuration and/or the revised restriction constraint information.

2.2. When the SN does not accept the configuration request from the MN, the SN rejects the configuration request from the MN, and ends the procedure.

Here, accepting, by the SN, no configuration request from the MN may include the following two cases.

Case I): the SN does not accept the configuration request from the MN.

Case II): the SN does not accept the condition configuration and/or restriction constraint information. Further, the SN does not accept the configuration request from the MN.

3.1. When the SN accepts the configuration request from the MN without modifying the condition configuration and/or the restriction constraint information, or when the SN accepts the configuration request from the MN and modifies the condition configuration and/or the restriction constraint information and the MN accepts the modified condition configuration and/or the modified restriction constraint information, the MN transmits the following information to the terminal device: a) the condition configuration (or the revised condition configuration) and the target PSCell configuration (or the SN configuration); or b) the condition configuration (or the revised condition configuration), the target PSCell configuration (or the SN configuration), and a radio resource configuration on the MN side.

3.2. When the SN accepts the configuration request from the MN and modifies the condition configuration and/or the restriction constraint information, but the MN does not accept the modified condition configuration and/or the modified restriction constraint information, the MN may reject the modification and end the procedure.

Example 2

This example is about the conditional intra-SN PSCell change. Here, the intra-SN PSCell change belongs to an MN-initiated PSCell change affecting MN. Some of the content of the PSCell change configuration is transmitted to the terminal device on the MN side and some is transmitted to the terminal device on the SN side. A PSCell change procedure of this example includes the following steps.

1. The MN transmits a configuration request to the SN. The configuration request is used to indicate configuring a conditional PSCell change.

Here, optionally, the MN may trigger the PSCell change procedure based on a measurement report reported by the terminal device.

Further, optionally, the MN also transmits, to the SN, a measurement result of the terminal device for the SN to determine a target PSCell.

Further, optionally, the MN also transmits, to the SN, a condition configuration of the PSCell change proposed by the MN (referred to as the PSCell change condition configuration for short).

Further, optionally, indication information is carried in the configuration request transmitted by the MN to the SN. The indication information is used to indicate a PSCell change type. Here, the PSCell change type may be an intra-SN PSCell change, or an inter-SN PSCell change, or an intra-SN PSCell change without affecting MN, or an intra-SN PSCell change affecting MN, etc.

Further, optionally, when the PSCell change type is the inter-SN PSCell change or the intra-SN PSCell change affecting MN, the MN also transmits restriction constraint information (restriction constraint information on the SN side) to the SN. The restriction constraint information is used to determine a restriction constraint condition for the SN to configure radio resources for the terminal device.

2.1. When the SN accepts the configuration request from the MN, the SN generates configuration information of the target PSCell (referred to as a target PSCell configuration for short) or configuration information of the SN (referred to as an SN configuration for short).

Here, accepting, by the SN, the configuration request from the MN may include the following two cases.

Case I): the SN accepts the condition configuration and/or the restriction constraint information. Further, the SN accepts the configuration request from the MN.

Case II): the SN does not accept the condition configuration and/or restriction constraint information. Further, the SN accepts the configuration request from the MN after modifying the condition configuration and/or the restriction constraint information, and transmits, to the MN, the revised condition configuration and/or the revised restriction constraint information.

2.2. When the SN does not accept the configuration request from the MN, the SN rejects the configuration request from the MN, and ends the procedure.

Here, accepting, by the SN, no configuration request from the MN may include the following two cases.

Case I): the SN does not accept the configuration request from the MN.

Case II): the SN does not accept the condition configuration and/or restriction constraint information. Further, the SN does not accept the configuration request from the MN.

3.1. When the SN accepts the configuration request from the MN without modifying the condition configuration and/or the restriction constraint information, or when the SN accepts the configuration request from the MN and modifies the condition configuration and/or the restriction constraint information and the MN accepts the modified condition configuration and/or the modified restriction constraint information, the MN transmits the following information to the terminal device: a) the condition configuration (or the revised condition configuration); or b) the condition configuration (or the revised condition configuration) and a radio resource configuration on the MN side.

In addition, the SN transmits the target PSCell configuration (or the SN configuration) to the terminal device.

3.2. When the SN accepts the configuration request from the MN and modifies the condition configuration and/or the restriction constraint information, but the MN does not accept the modified condition configuration and/or the modified restriction constraint information, the MN may reject the modification and end the procedure.

4. The terminal device receives a condition configuration list (or a revised condition configuration list) transmitted by the MN and, optionally, further receives a radio resource configuration list transmitted by the MN. The terminal device receives a target PSCell configuration list transmitted by the SN. The terminal device considers configurations in the condition configuration list (or the revised condition configuration list) and configurations in the target PSCell configuration list to be associated with each other in a one-to-one correspondence according to orders in which they are listed in the lists. That is, a condition configuration in the condition configuration list (and optionally, a radio resource configuration on the MN side) and a target PSCell configuration in the target PSCell configuration list with the same index number form a complete PSCell change configuration. A complete PSCell change configuration includes a condition configuration, a target PSCell configuration, and a radio resource configuration on the MN side.

Example 3

This example is about the conditional intra-SN PSCell change. Here, the intra-SN PSCell change belongs to an SN-initiated PSCell change affecting MN. The entire content of the PSCell change configuration is transmitted to the terminal device on the MN side. A PSCell change procedure of this example includes the following steps.

1. The SN transmits a configuration request to the MN. The configuration request is used to indicate configuring a conditional PSCell change.

Here, optionally, the SN may trigger the PSCell change procedure based on a measurement report reported by the terminal device.

Further, optionally, the SN also transmits, to the MN, a condition configuration of a PSCell change (referred to as the PSCell change condition configuration for short) proposed by the SN.

Further, optionally, indication information is carried in the configuration request transmitted by the SN to the MN. The indication information is used to indicate a PSCell change type. Here, the PSCell change type may be an intra-SN PSCell change, or an inter-SN PSCell change, or an intra-SN PSCell change without affecting MN, or an intra-SN PSCell change affecting MN, etc.

Further, optionally, when the PSCell change type is the inter-SN PSCell change or the intra-SN PSCell change affecting MN, the SN also transmits restriction constraint information (restriction constraint information on the SN side) to the MN. The restriction constraint information is used to determine a restriction constraint condition for the SN to configure radio resources for the terminal device.

Further, optionally, the SN may also transmit, to the MN, the target PSCell configuration corresponding to the PSCell change condition configuration.

2.1. When the MN accepts the configuration request from the SN, the MN generates a radio resource configuration on the MN side.

Here, accepting, by the MN, the configuration request from the SN may include the following two cases.

Case I), the MN accepts the condition configuration and/or the restriction constraint information. Further, the MN accepts the configuration request from the SN.

Case II), the MN does not accept the condition configuration and/or restriction constraint information. Further, the MN accepts the configuration request from the SN after modifying the condition configuration and/or the restriction constraint information, and transmits, to the SN, the revised condition configuration and/or the revised restriction constraint information.

Here, when the MN accepts the configuration request from the SN, the MN delivers the following information to the terminal device: a) the condition configuration (or the revised condition configuration) and the target PSCell configuration (or the SN configuration); or b) the condition configuration (or the revised condition configuration), the target PSCell configuration (or the SN configuration), and the radio resource configuration on the MN side.

2.2. When the MN does not accept the configuration request from the SN, the MN rejects the configuration request from the SN and ends the procedure.

Here, accepting, by the MN, no configuration request from the SN may include the following two cases.

Case I), the MN does not accept the configuration request from the SN.

Case II), the MN does not accept the condition configuration and/or restriction constraint information. Further, the MN does not accept the configuration request from the SN.

Example 4

This example is about the conditional intra-SN PSCell change. Here, the intra-SN PSCell change belongs to an SN-initiated PSCell change affecting MN. Some of the content of the PSCell change configuration is transmitted to the terminal device on the MN side and some is transmitted to the terminal device on the SN side. A PSCell change procedure of this example includes the following steps.

1. The SN transmits a configuration request to the MN. The configuration request is used to indicate configuring a conditional PSCell change.

Here, optionally, the SN may trigger the PSCell change procedure based on a measurement report reported by the terminal device.

Further, optionally, the SN also transmits, to the MN, a condition configuration of the PSCell change proposed by the SN (referred to as the PSCell change condition configuration for short).

Further, optionally, indication information is carried in the configuration request transmitted by the SN to the MN. The indication information is used to indicate a PSCell change type. Here, the PSCell change type may be an intra-SN PSCell change, or an inter-SN PSCell change, or an intra-SN PSCell change without affecting MN, or an intra-SN PSCell change affecting MN, etc.

Further, optionally, when the PSCell change type is the inter-SN PSCell change or the intra-SN PSCell change affecting MN, the SN also transmits restriction constraint information (restriction constraint information on the SN side) to the MN. The restriction constraint information is used to determine a restriction constraint condition for the SN to configure radio resources for the terminal device.

Further, optionally, the SN may also transmit, to the MN, the target PSCell configuration corresponding to the PSCell change condition configuration.

2.1. When the MN accepts the configuration request from the SN, the MN generates a radio resource configuration on the MN side.

Here, accepting, by the MN, the configuration request from the SN may include the following two cases.

Case I): the MN accepts the condition configuration and/or the restriction constraint information. Further, the MN accepts the configuration request from the SN.

Case II): the MN does not accept the condition configuration and/or restriction constraint information. Further, the MN accepts the configuration request from the SN after modifying the condition configuration and/or the restriction constraint information, and transmits, to the SN, the revised condition configuration and/or the revised restriction constraint information.

Here, when the MN accepts the configuration request from the SN, the MN delivers the following information to the terminal device: a) the condition configuration (or the revised condition configuration); or b) the condition configuration (or the revised condition configuration) and the radio resource configuration on the MN side; or c) the radio resource configuration on the MN side.

In addition, the SN transmits the following information to the terminal device: d) the target PSCell configuration (or the SN configuration), which may be implemented in combination with a) or b) described above; and e) the condition configuration (or the revised condition configuration) and the target PSCell configuration (or the SN configuration), which may be implemented in combination with c) described above.

2.2. When the MN does not accept the configuration request from the SN, the MN rejects the configuration request from the SN, and ends the procedure.

Here, accepting, by the MN, no configuration request from the SN may include the following two cases.

Case I): the MN does not accept the configuration request from the SN.

Case II): the MN does not accept the condition configuration and/or restriction constraint information. Further, the MN does not accept the configuration request from the SN.

3. The terminal device receives a condition configuration list (or a revised condition configuration list) transmitted by the MN and, optionally, further receives a radio resource configuration list transmitted by the MN. The terminal device receives a target PSCell configuration list transmitted by the SN and, optionally, further receives a condition configuration list transmitted by the SN. The terminal device considers configurations in the condition configuration list (or the revised condition configuration list) and configurations in the target PSCell configuration list to be associated with each other in a one-to-one correspondence according to orders in which they are listed in the lists. That is, a condition configuration in the condition configuration list (and optionally, a radio resource configuration on the MN side) and a target PSCell configurations in the target PSCell configuration list with the same index number form a complete PSCell change configuration. A complete PSCell change configuration includes a condition configuration, a target PSCell configuration, and a radio resource configuration on the MN side.

Example 5

This example is about a conditional inter-SN PSCell change. Here, the inter-SN PSCell change belongs to an MN-initiated PSCell change. The entire content of the PSCell change configuration is transmitted to the terminal device on the MN side. It should be noted that the conditional inter-SN PSCell change may also be referred to as a conditional SN change. A PSCell change procedure of this example includes the following steps.

1. The MN transmits a configuration request to a target SN. The configuration request is used to indicate configuring a conditional SN addition.

Here, optionally, the MN may trigger the PSCell change procedure (or an SN addition procedure) based on a measurement report reported by the terminal device.

Further, optionally, the MN also transmits, to the target SN, a measurement result of the terminal device for the target SN to determine a target PSCell.

Further, optionally, the MN may also transmit, to the target SN, a condition configuration of an SN addition (referred to as an SN addition condition configuration for short) proposed by the MN.

Further, optionally, the MN also transmits restriction constraint information (restriction constraint information on an original SN side) to the target SN. The restriction constraint information is used to determine a restriction constraint condition for the SN to configure radio resources for the terminal device.

2.1. When the target SN accepts the configuration request from the MN, the target SN generates configuration information of the target PSCell (referred to as a target PSCell configuration for short) and/or configuration information of the target SN (referred to as a target SN configuration for short) and transmits, to the MN, the configuration information of the target PSCell and/or the configuration information of the target SN.

Here, accepting, by the target SN, the configuration request from the MN may include the following two cases.

Case I): the target SN accepts the condition configuration and/or the restriction constraint information. Further, the target SN accepts the configuration request from the MN.

Case II): the target SN does not accept the condition configuration and/or restriction constraint information. Further, the target SN accepts the configuration request from the MN after modifying the condition configuration and/or the restriction constraint information, and transmits, to the MN, the revised condition configuration and/or the revised restriction constraint information.

2.2. When the target SN does not accept the configuration request from the MN, the target SN rejects the configuration request from the MN, and ends the procedure.

Here, accepting, by the target SN, no configuration request from the MN may include the following two cases.

Case I): the target SN does not accept the configuration request from the MN.

Case II): the target SN does not accept the condition configuration and/or restriction constraint information. Further, the target SN does not accept the configuration request from the MN.

3.1. When the target SN accepts the configuration request from the MN without modifying the condition configuration and/or the restriction constraint information, or when the target SN accepts the configuration request from the MN and modifies the condition configuration and/or the restriction constraint information and the MN accepts the modified condition configuration and/or the modified restriction constraint information, the MN transmits the following information to the terminal device: a) the condition configuration (or the revised condition configuration), and the target SN configuration and/or the target PSCell configuration; or b) the condition configuration (or the revised condition configuration), the target SN configuration and/or the target PSCell configuration, and a radio resource configuration on the MN side.

3.2. When the target SN accepts the configuration request from the MN and modifies the condition configuration and/or the restriction constraint information, but the MN does not accept the modified condition configuration and/or the modified restriction constraint information, the MN may reject the modification and end the procedure.

4. The terminal device triggers, in response to determining that the condition configuration (or the revised condition configuration) is satisfied, initiation of a random access procedure to the target PSCell. Here, a release on the original SN may be performed in any one of the following ways.

Way I): the target SN transmits an original SN release request to the MN; the MN transmits a release request to the original SN; the original SN releases a resource and notifies the MN of the release; and the MN notifies the target SN that the original SN has released the resource.

Way II): the target SN transmits an original SN release request to the original SN; the original SN releases a resource and notifies the target SN of the release; and the target SN notifies the MN that the original SN has released the resource.

Example 6

This example is about a conditional inter-SN PSCell change. Here, the inter-SN PSCell change belongs to an SN-initiated PSCell change. The entire content of the PSCell change configuration is transmitted to the terminal device on the MN side. It should be noted that the conditional inter-SN PSCell change may also be referred to as a conditional SN change. A PSCell change procedure of this example includes the following steps.

1. An original SN transmits a configuration request to the MN. The configuration request is used to indicate configuring a conditional PSCell change.

Here, optionally, the original SN may trigger the PSCell change procedure based on a measurement report reported by the terminal device.

Further, optionally, the original SN may also transmit, to the MN, a condition configuration of a PSCell change (referred to as a PSCell change condition configuration for short) proposed by the original SN.

Further, optionally, the original SN may also transmit, to the MN, identification information of a PSCell of a target SN corresponding to the PSCell change condition configuration. Here, the identification information of the PSCell includes at least one of a Physical Cell Identity (PCI), a frequency point, a New Radio-Cell Global Identity (N-CGI), and a next generation Node B identifier (gNB id).

Further, optionally, indication information is carried in the configuration request transmitted by the original SN to the MN. The indication information is used to indicate a PSCell change type. Here, the PSCell change type may be an intra-SN PSCell change, or an inter-SN PSCell change, or an intra-SN PSCell change without affecting MN, or an intra-SN PSCell change affecting MN, etc.

2. When the MN accepts the configuration request from the original SN, the MN transmits the configuration request to the target SN. The configuration request is used to indicate configuring a conditional SN addition.

Here, accepting, by the MN, the configuration request from the original SN may include the following two cases.

Case I): the MN accepts the PSCell change condition configuration. Further, the MN accepts the configuration request from the original SN.

Case II): the MN does not accept the PSCell change condition configuration. Further, the MN accepts the configuration request from the original SN after modifying the PSCell change condition configuration.

Further, optionally, the MN also transmits, to the target SN, a measurement result of the terminal device for the target SN to determine a target PSCell.

Further, optionally, the MN may also transmit, to the target SN, a condition configuration of an SN addition (referred to as an SN addition condition configuration for short) proposed by the MN.

Further, optionally, the MN also transmits restriction constraint information (restriction constraint information on an original SN side) to the target SN. The restriction constraint information is used to determine a restriction constraint condition for the SN to configure radio resources for the terminal device.

3.1. When the target SN accepts the configuration request from the MN, the target SN generates configuration information of the target PSCell (referred to as a target PSCell configuration for short) and/or configuration information of the target SN (referred to as a target SN configuration for short) and transmits, to the MN, the configuration information of the target PSCell and/or the configuration information of the target SN.

Here, accepting, by the target SN, the configuration request from the MN may include the following two cases.

Case I): the target SN accepts the condition configuration and/or the restriction constraint information. Further, the target SN accepts the configuration request from the MN.

Case II): the target SN does not accept the condition configuration and/or restriction constraint information. Further, the target SN accepts the configuration request from the MN after modifying the condition configuration and/or the restriction constraint information, and transmits, to the MN, the revised condition configuration and/or the revised restriction constraint information.

3.2. When the target SN does not accept the configuration request from the MN, the target SN rejects the configuration request from the MN, and ends the procedure.

Here, accepting, by the target SN, no configuration request from the MN may include the following two cases.

Case I): the target SN does not accept the configuration request from the MN.

Case II): the target SN does not accept the condition configuration and/or restriction constraint information. Further, the target SN does not accept the configuration request from the MN.

4.1. When the target SN accepts the configuration request from the MN without modifying the condition configuration and/or the restriction constraint information, or when the target SN accepts the configuration request from the MN and modifies the condition configuration and/or the restriction constraint information and the MN accepts the modified condition configuration and/or the modified restriction constraint information, the MN transmits the following information to the terminal device: a) the condition configuration (or the revised condition configuration), and the target SN configuration and/or the target PSCell configuration; or b) the condition configuration (or the revised condition configuration), the target SN configuration and/or the target PSCell configuration, and a radio resource configuration on the MN side.

4.2. When the target SN accepts the configuration request from the MN and modifies the condition configuration and/or the restriction constraint information, but the MN does not accept the modified condition configuration and/or the modified restriction constraint information, the MN may reject the modification and end the procedure.

5. The terminal device triggers, in response to determining that the condition configuration (or the revised condition configuration) is satisfied, initiation of a random access procedure to the target PSCell. Here, a release on the original SN may be performed in any one of the following ways.

Way I): the target SN transmits an original SN release request to the MN; the MN transmits a release request to the original SN; the original SN releases a resource and notifies the MN of the release; and the MN notifies the target SN that the original SN has released the resource.

Way II): the target SN transmits an original SN release request to the original SN; the original SN releases a resource and notifies the target SN of the release; and the target SN notifies the MN that the original SN has released the resource.

Example 7

This example is about a conditional inter-SN PSCell change. Here, the inter-SN PSCell change belongs to an SN-initiated PSCell change. Some of the content of the PSCell change configuration is transmitted to the terminal device on the MN side and some is transmitted to the terminal device on the SN side. It should be noted that the conditional inter-SN PSCell change may also be referred to as a conditional SN change. A PSCell change procedure of this example includes the following steps.

1. An original SN transmits a configuration request to a target SN. The configuration request is used to indicate configuring a conditional PSCell change.

Here, optionally, the original SN may trigger the PSCell change procedure based on a measurement report reported by the terminal device.

Further, optionally, the original SN may also transmit, to the target SN, a condition configuration of a PSCell change (referred to as a PSCell change condition configuration for short) proposed by the original SN.

Further, optionally, the original SN also transmits restriction constraint information (restriction constraint information on an original SN side) to the target SN. The restriction constraint information is used to determine a restriction constraint condition for the SN to configure radio resources for the terminal device.

2. When the target SN accepts the configuration request from the original SN, the target SN generates configuration information of the target PSCell (referred to as a target PSCell configuration for short) and/or configuration information of the target SN (referred to as a target SN configuration for short) and transmits, to the original SN, the configuration information of the target PSCell and/or the configuration information of the target SN.

Here, accepting, by the target SN, the configuration request from the original SN may include the following two cases.

Case I): the target SN accepts the condition configuration and/or the restriction constraint information. Further, the target SN accepts the configuration request from the original SN.

Case II): the target SN does not accept the condition configuration and/or restriction constraint information. Further, the target SN accepts the configuration request from the original SN after modifying the condition configuration and/or the restriction constraint information, and transmits, to the original SN, the revised condition configuration and/or the revised restriction constraint information.

3. The original SN transmits, to the MN, the condition configuration (or the revised condition configuration), the target PSCell configuration, and/or the target SN configuration.

Further, optionally, the original SN also transmits the restriction constraint information (or the revised restriction constraint information) to the MN.

4.1. When the MN accepts the condition configuration (or the revised condition configuration) and/or the restriction constraint information (or the revised restriction constraint information), the MN initiates an SN addition process to the target SN or the target PSCell. On the other hand, the MN transmits the following information to the terminal device: a) the condition configuration (or the revised condition configuration), the target SN configuration and/or the target PSCell configuration; or b) the condition configuration (or the revised condition configuration), the target SN configuration and/or the target PSCell configuration, and a radio resource configuration on the MN side; or c) the condition configuration (or the revised condition configuration) and a radio resource configuration on the MN side; or d) a radio resource configuration on the MN side; or e) the target SN configuration and/or the target PSCell configuration and a radio resource configuration on the MN side.

In addition, the SN transmits the following information to the terminal device: f) the condition configuration (or the revised condition configuration), the target SN configuration and/or the target PSCell configuration, which may be implemented in combination with d) described above; and g) the condition configuration (or the revised condition configuration), which may be implemented in combination with e) described above.

4.2. When the MN does not accept the condition configuration (or the revised condition configuration) and/or the restriction constraint information (or the revised restriction constraint information), the MN rejects the configuration request and ends the procedure.

5. The terminal device receives a configuration list transmitted by the MN and a configuration list transmitted by the SN. The terminal device considers configurations in the configuration list transmitted by the MN and configurations in the configuration list transmitted by the SN to be associated with each other in a one-to-one correspondence according to orders in which they are listed in the lists. That is, a configuration in the configuration list transmitted by the MN and a configuration in the configuration list transmitted by the SN with the same index number form a complete PSCell change configuration. A complete PSCell change configuration includes a condition configuration, a target PSCell configuration, and a radio resource configuration on the MN side.

6. The terminal device triggers, in response to determining that the condition configuration (or the revised condition configuration) is satisfied, initiation of a random access procedure to the target PSCell. Here, a release on the original SN may be performed in any one of the following ways.

Way I): the target SN transmits an original SN release request to the MN; the MN transmits a release request to the original SN; the original SN releases a resource and notifies the MN of the release; and the MN notifies the target SN that the original SN has released the resource.

Way II): the target SN transmits an original SN release request to the original SN; the original SN releases a resource and notifies the target SN of the release; and the target SN notifies the MN that the original SN has released the resource.

Example 8

This example is about a conditional SN addition. Here, the SN addition belongs to an MN-initiated SN addition. The entire content of an SN addition configuration is transmitted to the terminal device on the MN side. An SN addition procedure of this example includes the following steps.

1. The MN transmits a configuration request to a target SN. The configuration request is used to indicate configuring a conditional SN addition.

Here, optionally, the MN may trigger the SN addition procedure based on a measurement report reported by the terminal device.

Further, optionally, the MN also transmits, to the target SN, a measurement result of the terminal device for the target SN to determine a target PSCell.

Further, optionally, the MN may also transmit, to the target SN, a condition configuration of an SN addition (referred to as an SN addition condition configuration for short) proposed by the MN.

Further, optionally, the MN also transmits restriction constraint information to the target SN. The restriction constraint information is used to determine a restriction constraint condition for the target SN to configure radio resources for the terminal device.

2.1. When the target SN accepts the configuration request from the MN, the target SN generates configuration information of the target PSCell (referred to as a target PSCell configuration for short) and/or configuration information of the target SN (referred to as a target SN configuration for short) and transmits, to the MN, the configuration information of the target PSCell and/or the configuration information of the target SN.

Here, accepting, by the target SN, the configuration request from the MN may include the following two cases.

Case I): the target SN accepts the condition configuration and/or the restriction constraint information. Further, the target SN accepts the configuration request from the MN.

Case II): the target SN does not accept the condition configuration and/or restriction constraint information. Further, the target SN accepts the configuration request from the MN after modifying the condition configuration and/or the restriction constraint information, and transmits, to the MN, the revised condition configuration and/or the revised restriction constraint information.

2.2. When the target SN does not accept the configuration request from the MN, the target SN rejects the configuration request from the MN, and ends the procedure.

Here, accepting, by the target SN, no configuration request from the MN may include the following two cases.

Case I): the target SN does not accept the configuration request from the MN.

Case II): the target SN does not accept the condition configuration and/or restriction constraint information. Further, the target SN does not accept the configuration request from the MN.

3.1. When the target SN accepts the configuration request from the MN without modifying the condition configuration and/or the restriction constraint information, or when the target SN accepts the configuration request from the MN and modifies the condition configuration and/or the restriction constraint information and the MN accepts the modified condition configuration and/or the modified restriction constraint information, the MN transmits the following information to the terminal device: a) the condition configuration (or the revised condition configuration), and the target SN configuration and/or the target PSCell configuration; or b) the condition configuration (or the revised condition configuration), the target SN configuration and/or the target PSCell configuration, and a radio resource configuration on the MN side.

3.2. When the target SN accepts the configuration request from the MN and modifies the condition configuration and/or the restriction constraint information, but the MN does not accept the modified condition configuration and/or the modified restriction constraint information, the MN may reject the modification and end the procedure.

It should be noted that the restriction constraint information involved in the embodiments of the present disclosure refers to constraint information configured by the MN to the SN for the SN to configure radio resources on the SN side for the terminal device, so as to prevent radio resource configurations of the MN and the SN from going beyond a capacity of the terminal device.

It should be noted that the SN addition condition configuration involved in the embodiments of the present disclosure refers to a condition for the terminal device to determine, based on a measurement result, autonomously adding an SN associated with the condition configuration.

It should be noted that SN configuration information involved in the embodiments of the present disclosure includes PSCell configuration information and/or configuration information of all SCells on the SN side.

Figure 8:
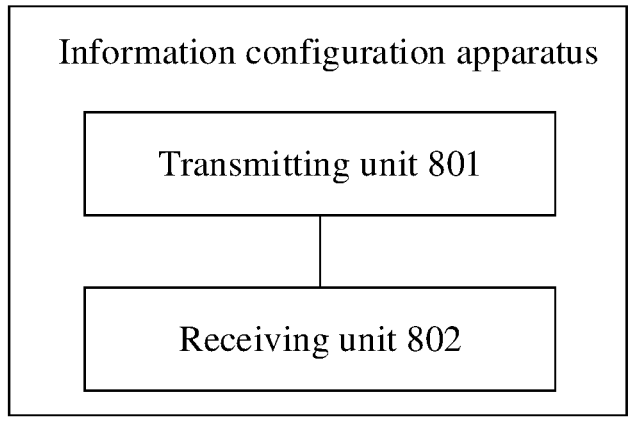
FIG. 8 is a first schematic block diagram showing a structure of an information configuration apparatus according to an embodiment of the present disclosure.

FIG. 8 is a first schematic block diagram showing a structure of an information configuration apparatus according to an embodiment of the present disclosure. The information configuration apparatus is applied in an MN side. As illustrated in FIG. 8, the information configuration apparatus includes a transmitting unit 801 and a receiving unit 802.

The transmitting unit 801 is configured to transmit a first request message to an SN. The first request message is used to request for configuring a conditional PSCell change.

The receiving unit 802 is configured to receive a first response message transmitted by the SN. The first response message is used for indicating that the SN accepts the first request message.

The transmitting unit 801 is further configured to transmit, to a terminal device, at least one of a PSCell change condition configuration, a target PSCell configuration, and a radio resource configuration on the MN side.

In an optional implementation, the first request message carries a first PSCell change condition configuration. The first PSCell change condition configuration is a PSCell change condition configuration proposed by the MN.

In an optional implementation, when the SN accepts the first PSCell change condition configuration, the PSCell change condition configuration transmitted by the transmitting unit 801 to the terminal device is the first PSCell change condition configuration.

In an optional implementation, when the SN does not accept the first PSCell change condition configuration, the first response message carries a second PSCell change condition configuration. The second PSCell change condition configuration is a PSCell change condition configuration revised by the SN. The PSCell change condition configuration transmitted by the transmitting unit 801 to the terminal device is the second PSCell change condition configuration.

In an optional implementation, the first request message carries first indication information that indicates a PSCell change type.

In an optional implementation, the PSCell change type is an intra-SN PSCell change, or an inter-SN PSCell change, or an intra-SN PSCell change without affecting MN, or an intra-SN PSCell change affecting MN.

In an optional implementation, when the PSCell change type indicated by the first indication information is the inter-SN PSCell change or the intra-SN PSCell change affecting MN, the first request message further carries first restriction constraint information. The first restriction constraint information is used for restricting configuration, by the SN for the terminal device, of a radio resource configuration on an SN side.

In an optional implementation, when the SN does not accept the first restriction constraint information, the first response message carries second restriction constraint information. The second restriction constraint information is restriction constraint information revised by the SN.

In an optional implementation, the first request message carries a measurement result of the terminal device. The measurement result is used by the SN for configuring the target PSCell configuration.

In an optional implementation, the first response message carries the target PSCell configuration configured by the SN. The transmitting unit 801 is configured to transmit, to the terminal device, the PSCell change condition configuration and the target PSCell configuration; or transmit, to the terminal device, the PSCell change condition configuration, the target PSCell configuration, and the radio resource configuration on the MN side.

In an optional implementation, the transmitting unit 801 is configured to transmit, to the terminal device, the PSCell change condition configuration, the target PSCell configuration being transmitted by the SN to the terminal device; or transmit, to the terminal device, the PSCell change condition configuration and the radio resource configuration on the MN side, the target PSCell configuration being transmitted by the SN to the terminal device.

In an optional implementation, configurations on the MN side and configurations on an SN side are associated with each other based on configuration indices. A plurality of associated configurations form one PSCell change configuration.

A person skilled in the art should understand that the above relevant description of the information configuration apparatus according to embodiments of the present disclosure can be understood with reference to relevant description of the information configuration method according to embodiments of the present disclosure.

Figure 9:
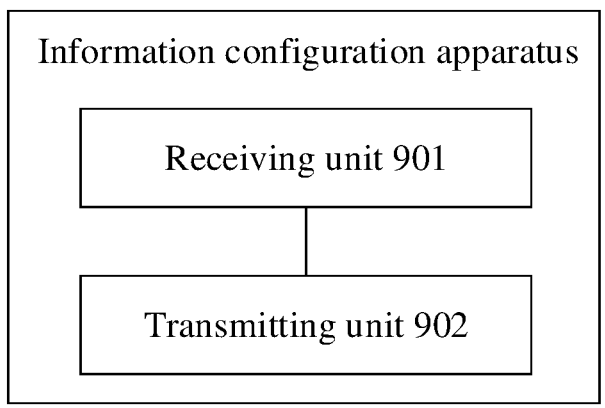
FIG. 9 is a second schematic block diagram showing a structure of an information configuration apparatus according to an embodiment of the present disclosure.

FIG. 9 is a second schematic block diagram showing a structure of an information configuration apparatus according to an embodiment of the present disclosure. The information configuration apparatus is applied in an MN side. As illustrated in FIG. 9, the information configuration apparatus includes a receiving unit 901 and a transmitting unit 902.

The receiving unit 901 is configured to receive a first request message transmitted by an SN. The first request message is used to request for configuring a conditional PSCell change.

The transmitting unit 902 is configured to transmit a first response message to the SN, the first response message being used for indicating that the MN accepts the first request message; and transmit, to a terminal device, at least one of a PSCell change condition configuration, a target PSCell configuration, and a radio resource configuration on the MN side.

In an optional implementation, the first request message carries a first PSCell change condition configuration. The first PSCell change condition configuration is a PSCell change condition configuration proposed by the SN.

In an optional implementation, when the MN accepts the first PSCell change condition configuration, the PSCell change condition configuration transmitted by the transmitting unit 902 to the terminal device is the first PSCell change condition configuration.

In an optional implementation, when the MN does not accept the first PSCell change condition configuration, the first response message carries a second PSCell change condition configuration. The second PSCell change condition configuration is a PSCell change condition configuration revised by the MN. The PSCell change condition configuration transmitted by the transmitting unit 902 to the terminal device is the second PSCell change condition configuration.

In an optional implementation, the first request message carries first indication information that indicates a PSCell change type.

In an optional implementation, the PSCell change type is an intra-SN PSCell change, or an inter-SN PSCell change, or an intra-SN PSCell change without affecting MN, or an intra-SN PSCell change affecting MN.

In an optional implementation, when the PSCell change type indicated by the first indication information is the inter-SN PSCell change or the intra-SN PSCell change affecting MN, the first request message further carries first restriction constraint information. The first restriction constraint information is used for restricting configuration, by the SN for the terminal device, of a radio resource configuration on an SN side.

In an optional implementation, when the MN does not accept the first restriction constraint information, the first response message carries second restriction constraint information. The second restriction constraint information is restriction constraint information revised by the MN.

In an optional implementation, the first request message carries the target PSCell configuration configured by the SN. The transmitting unit 902 is configured to transmit, to the terminal device, the PSCell change condition configuration and the target PSCell configuration; or transmit, to the terminal device, the PSCell change condition configuration, the target PSCell configuration, and the radio resource configuration on the MN side.

In an optional implementation, the transmitting unit 902 is configured to: transmit, to the terminal device, the PSCell change condition configuration, the target PSCell configuration being transmitted by the SN to the terminal device; or transmit, to the terminal device, the PSCell change condition configuration and the radio resource configuration on the MN side, the target PSCell configuration being transmitted by the SN to the terminal device; or transmit, to the terminal device, the radio resource configuration on the MN side, the PSCell change condition configuration and the target PSCell configuration being transmitted to the terminal device by the SN.

In an optional implementation, configurations on the MN side and configurations on an SN side are associated with each other based on configuration indices. A plurality of associated configurations form one PSCell change configuration.

A person skilled in the art should understand that the above relevant description of the information configuration apparatus according to embodiments of the present disclosure can be understood with reference to relevant description of the information configuration method according to embodiments of the present disclosure.

Figure 10:
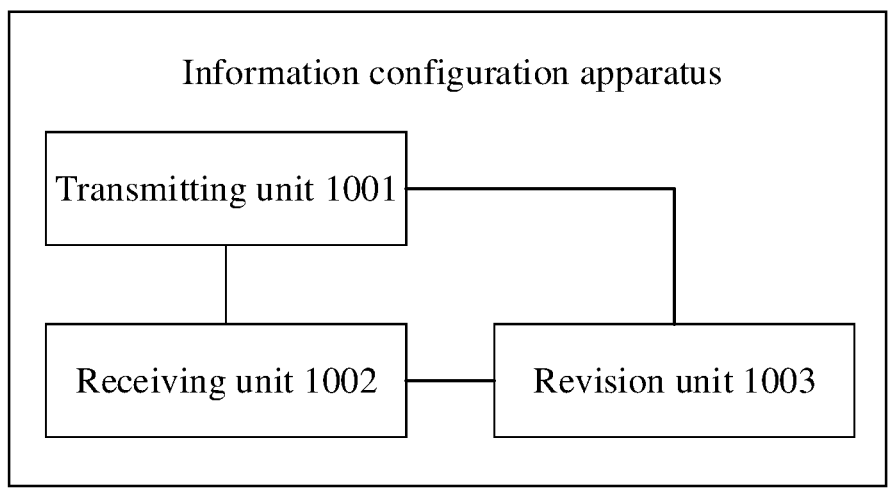
FIG. 10 is a third schematic block diagram showing a structure of an information configuration apparatus according to an embodiment of the present disclosure.

FIG. 10 is a third schematic block diagram showing a structure of an information configuration apparatus according to an embodiment of the present disclosure. The information configuration apparatus is applied in an MN side. As illustrated in FIG. 10, the information configuration apparatus includes a transmitting unit 1001 and a receiving unit 1002.

The transmitting unit 1001 is configured to transmit a second request message to a target SN. The second request message is used to request for configuring a conditional SN addition.

The receiving unit 1002 is configured to receive a second response message transmitted by the target SN. The second response message is used for indicating that the target SN accepts the second request message.

The transmitting unit 1001 is further configured to transmit, to a terminal device, at least one of an SN addition condition configuration, a target SN configuration, a target PSCell configuration, and a radio resource configuration on the MN side.

In an optional implementation, the second request message carries a first SN addition condition configuration. The first SN addition condition configuration is an SN addition condition configuration proposed by the MN.

In an optional implementation, when the target SN accepts the first SN addition condition configuration, a target SN addition condition configuration transmitted by the transmitting unit 1001 to the terminal device is the first SN addition condition configuration.

In an optional implementation, when the target SN does not accept the first SN addition condition configuration, the second response message carries a second SN addition condition configuration. The second SN addition condition configuration is an SN addition condition configuration revised by the target SN. The SN addition condition configuration transmitted by the transmitting unit 1001 to the terminal device is the second SN addition condition configuration.

In an optional implementation, the second request message carries first restriction constraint information. The first restriction constraint information is used for restricting configuration, by the target SN for the terminal device, of a radio resource configuration on a target SN side.

In an optional implementation, when the target SN does not accept the first restriction constraint information, the second response message carries second restriction constraint information. The second restriction constraint information is restriction constraint information revised by the target SN.

In an optional implementation, the second request message carries a measurement result of the terminal device. The measurement result is used by the target SN for configuring at least one of the target SN configuration and the target PSCell configuration.

In an optional implementation, the second response message carries at least one of the target SN configuration configured by the target SN and the target PSCell configuration configured by the target SN. The transmitting unit 1001 is configured to: transmit, to the terminal device, the SN addition condition configuration and at least one of the target SN configuration and the target PSCell configuration; or transmit, to the terminal device, the SN addition condition configuration, the radio resource configuration on the MN side, and at least one of the target SN configuration and the target PSCell configuration.

In an optional implementation, the receiving unit 1002 is further configured to receive a third request message transmitted by an original SN. The third request message is used to request for configuring a conditional PSCell change. The transmitting unit 1001 is further configured to transmit a third response message to the original SN. The third response message is used for indicating that the MN accepts the third request message.

In an optional implementation, the third request message carries a first PSCell change condition configuration. The first PSCell change condition configuration is a PSCell change condition configuration proposed by the original SN.

In an optional implementation, the apparatus further includes a revision unit 1003. The revision unit 1003 is configured to revise, when the first PSCell change condition configuration is not accepted, the first PSCell change condition configuration to a second PSCell change condition configuration.

In an optional implementation, the third request message further carries identification information of a target PSCell corresponding to the first PSCell change condition configuration. The target PSCell is one of cells of the target SN.

In an optional implementation, the identification information of the target PSCell includes at least one of a Physical Cell Identity (PCI), a frequency point, a New Radio-Cell Global Identity (N-CGI), and a base station identifier.

In an optional implementation, the third request message carries first indication information that indicates a PSCell change type.

In an optional implementation, the PSCell change type is an intra-SN PSCell change, or an inter-SN PSCell change, or an intra-SN PSCell change without affecting MN, or an intra-SN PSCell change affecting MN.

In an optional implementation, when the terminal device triggers, based on the SN addition condition configuration, initiation of a random access procedure to the target SN, the target SN transmits an original SN release request message to the MN, to trigger the MN to request an original SN to release a resource; or the target SN transmits the original SN release request message to the original SN, to trigger the original SN to release a resource.

A person skilled in the art should understand that the above relevant description of the information configuration apparatus according to embodiments of the present disclosure can be understood with reference to relevant description of the information configuration method according to embodiments of the present disclosure.

Figure 11:
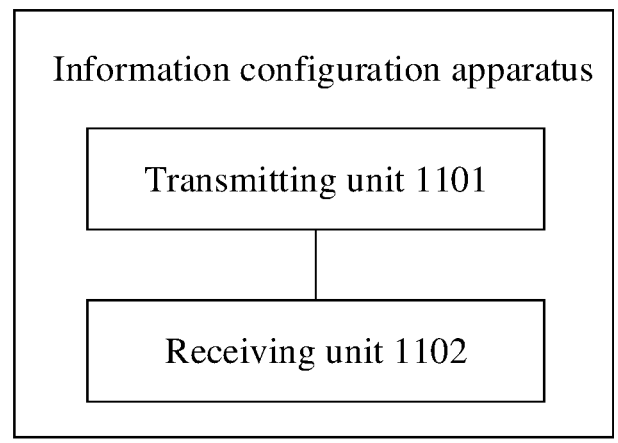
FIG. 11 is a fourth schematic block diagram showing a structure of an information configuration apparatus according to an embodiment of the present disclosure.

FIG. 11 is a fourth schematic block diagram showing a structure of an information configuration apparatus according to an embodiment of the present disclosure. The information configuration apparatus is applied in an original SN side. As illustrated in FIG. 11, the information configuration apparatus includes a transmitting unit 1101 and a receiving unit 1102.

The transmitting unit 1101 is configured to transmit a fourth request message to a target SN. The fourth request message is used to request for configuring a conditional PSCell change.

The receiving unit 1102 is configured to receive a fourth response message transmitted by the target SN. The fourth response message indicates that the target SN accepts the fourth request message. The fourth response message carries at least one of a target SN configuration configured by the target SN and a target PSCell configuration configured by the target SN.

The transmitting unit 1101 is further configured to transmit, to an MN, a PSCell change condition configuration and at least one of the target SN configuration and the target PSCell configuration.

In an optional implementation, the PSCell change condition configuration and at least one of the target SN configuration and the target PSCell configuration are transmitted by the MN to a terminal device; or the PSCell change condition configuration and at least one of the target SN configuration and the target PSCell configuration are transmitted by the original SN to a terminal device; or the PSCell change condition configuration is transmitted by the MN to a terminal device, and the target SN configuration and/or the target PSCell configuration is transmitted by the original SN to the terminal device; or the PSCell change condition configuration is transmitted by the original SN to a terminal device, and the target SN configuration and/or the target PSCell configuration is transmitted by the MN to the terminal device.

In an optional implementation, a radio resource configuration on an MN side is transmitted by the MN to the terminal device.

In an optional implementation, configurations on an MN side and configurations on the original SN side are associated with each other based on configuration indices. A plurality of associated configurations form one PSCell change configuration.

In an optional implementation, the fourth request message carries a first PSCell change condition configuration and/or first restriction constraint information. The first PSCell change condition configuration is a PSCell change condition configuration proposed by the original SN. The first restriction constraint information is used for restricting configuration, by the SN for the terminal device, of a radio resource configuration on an SN side.

In an optional implementation, when the target SN does not accept the first PSCell change condition configuration and/or first restriction constraint information, the fourth response message further carries a second PSCell change condition configuration and/or second restriction constraint information. The second PSCell change condition configuration is a PSCell change condition configuration revised by the target SN. The second restriction constraint information is restriction constraint information revised by the target SN.

In an optional implementation, when the terminal device triggers, based on the PSCell change condition configuration, initiation of a random access procedure to the target SN, the target SN transmits an original SN release request message to the MN, to trigger the MN to request the original SN to release a resource; or the target SN transmits the original SN release request message to the original SN, to trigger the original SN to release a resource.

A person skilled in the art should understand that the above relevant description of the information configuration apparatus according to embodiments of the present disclosure can be understood with reference to relevant description of the information configuration method according to embodiments of the present disclosure.

Figure 12:
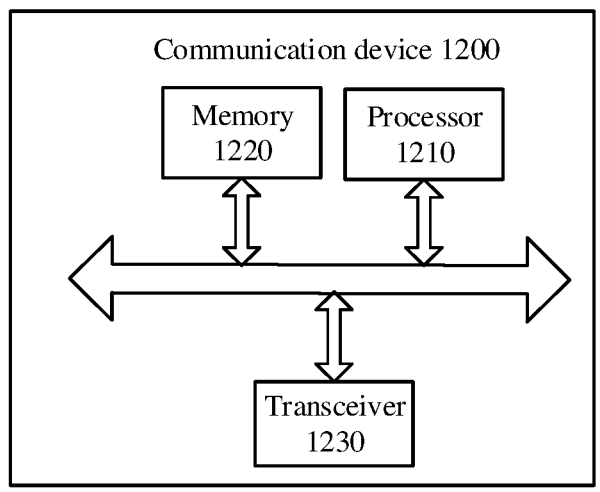
FIG. 12 is a schematic block diagram showing a structure of a communication device according to an embodiment of the present disclosure.

FIG. 12 is a schematic block diagram showing a structure of a communication device 1200 according to an embodiment of the present disclosure. The communication device may be a terminal device or a network device (e.g., an MN and an SN). The communication device 1200 illustrated in FIG. 12 includes a processor 1210. The processor 1210 can invoke and run a computer program from a memory to perform the method according to an embodiment of the present disclosure.

Optionally, as illustrated in FIG. 12, the communication device 1200 may further include a memory 1220. The processor 1210 may invoke and run a computer program from the memory 1220 to perform the method according to an embodiment of the present disclosure.

Here, the memory 1220 may be a separate component independent of the processor 1210, or may be integrated in the processor 1210.

Optionally, as illustrated in FIG. 12, the communication device 1200 may further include a transceiver 1230. The processor 1210 may control the transceiver 1230 to communicate with other devices. Specifically, information or data may be transmitted to other devices, or information or data transmitted by other devices may be received.

Here, the transceiver 1230 may include a transmitter and a receiver. The transceiver 1230 may further include one or more antennas.

Optionally, the communication device 1200 may specifically be a network device according to an embodiment of the present disclosure. The communication device 1200 may execute corresponding processes implemented by the network device in methods according to embodiments of the present disclosure. For brevity, repeated description is omitted herein.

Optionally, the communication device 1200 may specifically be the mobile terminal/terminal device according to an embodiment of the present disclosure. The communication device 1200 may execute corresponding processes implemented by the mobile terminal/terminal device in methods according to embodiments of the present disclosure. For brevity, repeated description is omitted herein.

Figure 13:
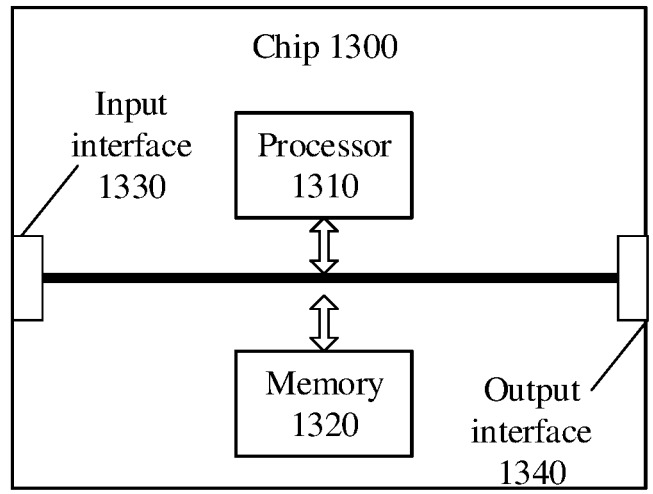
FIG. 13 is a schematic block diagram showing a structure of a chip according to an embodiment of the present disclosure.

FIG. 13 is a schematic block diagram showing a structure of a chip according to an embodiment of the present disclosure. A chip 1300 illustrated in FIG. 13 includes a processor 1310. The processor 1310 can invoke and run a computer program from a memory to perform the method according to an embodiment of the present disclosure.

Optionally, as illustrated in FIG. 13, the chip 1300 may further include a memory 1320. The processor 1310 may invoke and run a computer program from the memory 1320 to perform the method according to an embodiment of the present disclosure.

Here, the memory 1320 may be a separate component independent of the processor 1310, or may be integrated in the processor 1310.

Optionally, the chip 1300 may further include an input interface 1330. The processor 1310 can control the input interface 1330 to communicate with other devices or chips. Specifically, information or data transmitted by other devices or chips can be obtained.

Optionally, the chip 1300 may further include an output interface 1340. The processor 1310 can control the output interface 1340 to communicate with other devices or chips. Specifically, information or data may be transmitted to other devices or chips.

Optionally, the chip can be applied to the network device according to an embodiment of the present disclosure. In addition, the chip can execute corresponding processes implemented by the network device in methods according to embodiments of the present disclosure. For brevity, repeated description is omitted herein.

Optionally, the chip can be applied to the mobile terminal/terminal device according to an embodiment of the present disclosure. The chip can execute corresponding processes implemented by the mobile terminal/terminal device in methods according to embodiments of the present disclosure. For brevity, repeated description is omitted herein.

It should be understood that the chip mentioned in the embodiments of the present disclosure may also be referred to as a system-level chip, a system-chip, a chip system, or a system-on-chip.

Figure 14:
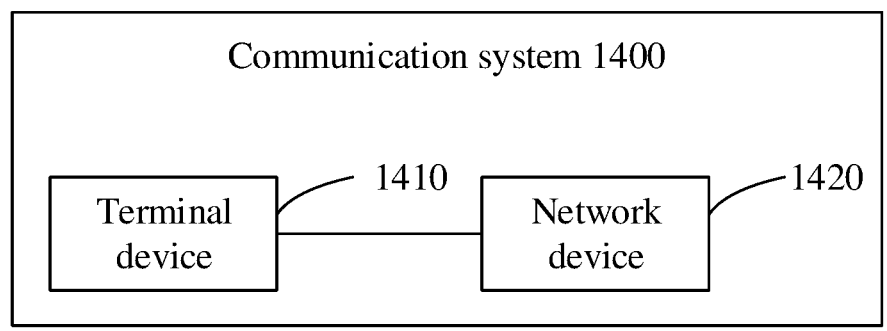
FIG. 14 is a schematic block diagram of a communication system according to an embodiment of the present disclosure.

FIG. 14 is a schematic block diagram of a communication system 1400 according to an embodiment of the present disclosure. As illustrated in FIG. 14, the communication system 1400 includes a terminal device 1410 and a network device 1420.

Here, the terminal device 1410 can be configured to implement the corresponding functions implemented by the terminal device in the above methods. The network device 1420 can be configured to implement corresponding functions implemented by the network device in the above methods. For brevity, repeated description is omitted herein.

It is to be noted that the processor in the embodiment of the present disclosure may be an integrated circuit chip with signal processing capability. In an implementation, the steps of the above method embodiments can be implemented by hardware integrated logic circuits in the processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. For illustrating, rather than limiting, many forms of RAMs are available, including for example Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM) or the like. That is, the memory in the embodiments of the present disclosure is intended to include, but not limited to, these and any other suitable types of memories.

An embodiment of the present disclosure also provides a computer-readable storage medium for storing a computer program.

Optionally, the computer-readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer-readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units; that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit or alternatively be separate physical modules, or two or more units may be integrated into one unit.

When the function is implemented in the form of a software functional unit and sold or used as a standalone product, it can be stored in a computer-readable storage medium. Based on this understanding, the technical solutions according to the present disclosure, essentially or the part thereof that contributes to the prior art, or part of the technical solutions can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include various mediums capable of storing program codes, such as a Universal Serial Bus flash drive, a mobile hard disk, a Read-Only Memory (ROM), a Random Access Memory (RAM), a magnetic disk, or an optical disc.

While the specific embodiments of the present disclosure have been described above, the protection scope of the present disclosure is not limited to these embodiments. Various variants and alternatives can be easily conceived by any of those skilled in the art without departing from the technical scope of the present disclosure. Therefore, these variants and alternatives are to be encompassed by the protection scope of present disclosure as defined by the claims as attached.

What is claimed is:

1. An information configuration method, comprising:
transmitting, by a Master Node (MN), a first request message to a Secondary Node (SN), wherein the first request message is used to request for configuring a conditional Primary Secondary Cell (PSCell) change; receiving, by the MN, a first response message transmitted by the SN, wherein the first response message is used for indicating that the SN accepts the first request message; and transmitting, by the MN to a terminal device, at least one of a PSCell change condition configuration, a target PSCell configuration, and a radio resource configuration on an MN side, wherein the first request message carries a first PSCell change condition configuration, the first PSCell change condition configuration is a PSCell change condition configuration proposed by the MN, the first request message further carries first indication information that indicates a PSCell change type, and the PSCell change type is one of: an intra-SN PSCell change, an inter-SN PSCell change, an intra-SN PSCell change without affecting MN, and an intra-SN PSCell change affecting MN.

2. The method according to claim 1, wherein when the SN accepts the first PSCell change condition configuration, the PSCell change condition configuration transmitted by the MN to the terminal device is the first PSCell change condition configuration.

3. The method according to claim 1, wherein the first request message further carries a measurement result of the terminal device, and the measurement result is used by the SN for configuring the target PSCell configuration.

4. The method according to claim 1, wherein said transmitting, by the MN to the terminal device, at least one of the PSCell change condition configuration, the target PSCell configuration, and the radio resource configuration on the MN side comprises:
transmitting, by the MN to the terminal device, the PSCell change condition configuration, the target PSCell configuration, and the radio resource configuration on the MN side.

5. The method according to claim 1, wherein said transmitting, by the MN to the terminal device, at least one of the PSCell change condition configuration, the target PSCell configuration, and the radio resource configuration on the MN side comprises:

transmitting, by the MN to the terminal device, the PSCell change condition configuration and the radio resource configuration on the MN side, wherein the target PSCell configuration is transmitted by the SN to the terminal device.

6. A communication device, comprising:
a memory having a computer program stored thereon; and
a processor configured to invoke and execute the computer program stored in the memory to perform the method according to claim 1.

7. An information configuration method, comprising:
receiving, by a Master Node (MN), a first request message transmitted by a Secondary Node (SN), wherein the first request message is used to request for configuring a conditional Primary Secondary Cell (PSCell) change; transmitting, by the MN, a first response message to the SN, wherein the first response message is used for indicating that the MN accepts the first request message; and transmitting, by the MN to the terminal device, at least one of a PSCell change condition configuration, a target PSCell configuration, and a radio resource configuration on an MN side, wherein the first request message carries a first PSCell change condition configuration, the first PSCell change condition configuration is a PSCell change condition configuration proposed by the SN, the first request message further carries first indication information that indicates a PSCell change type, and the PSCell change type is one of: an intra-SN PSCell change, an inter-SN PSCell change, an intra-SN PSCell change without affecting MN, and an intra-SN PSCell change affecting MN.

8. A communication device, comprising:
a memory having a computer program stored thereon; and
a processor configured to invoke and execute the computer program stored in the memory to perform the method according to claim 7.

9. An information configuration method, comprising:
receiving, by a Master Node (MN), a third request message transmitted by an original Secondary Node (SN), wherein the third request message carries first indication information that indicates a PSCell change type, and the third request message is used to request for configuring a conditional PSCell change; transmitting, by the MN, a third response message to the original SN, wherein the third response message is used for indicating that the MN accepts the third request message; transmitting, by the MN, a second request message to a target SN, wherein the second request message is used to request for configuring a conditional SN addition; receiving, by the MN, a second response message transmitted by the target SN, wherein the second response message is used for indicating that the target SN accepts the second request message; and transmitting, by the MN to a terminal device, at least one of an SN addition condition configuration, a target SN configuration, a target Primary Secondary Cell (PSCell) configuration, and a radio resource configuration on an MN side, wherein the second request message carries a first SN addition condition configuration, and the first SN addition condition configuration is an SN addition condition configuration proposed by the MN.

10. The method according to claim 9, wherein the second request message further carries a measurement result of the terminal device, and the measurement result is used by the target SN for configuring at least one of the target SN configuration and the target PSCell configuration.

11. The method according to claim 9, wherein the second response message carries at least one of the target SN configuration configured by the target SN and the target PSCell configuration configured by the target SN.

12. The method according to claim 9, wherein the third request message further carries: a first PSCell change condition configuration, wherein the first PSCell change condition configuration is a PSCell change condition configuration proposed by the original SN.

13. The method according to claim 9, wherein the third request message further carries identification information of a target PSCell corresponding to the first PSCell change condition configuration, and the target PSCell is one of cells of the target SN.

14. The method according to claim 13, wherein the identification information of the target PSCell comprises at least one of a Physical Cell Identity (PCI), a frequency point, a New Radio-Cell Global Identity (N-CGI), and a base station identifier.

15. The method according to claim 9, further comprising, when the terminal device triggers, based on the SN addition condition configuration, initiation of a random access procedure to the target SN:
transmitting, by the target SN, an original SN release request message to the MN, to trigger the MN to request an original SN to release a resource.

16. A communication device, comprising:
a memory having a computer program stored thereon; and
a processor configured to invoke and execute the computer program stored in the memory to perform the method according to claim 9.

* * * * *